United States Patent
Kim et al.

(10) Patent No.: US 12,069,563 B2
(45) Date of Patent: Aug. 20, 2024

(54) METHOD AND APPARATUS FOR SUPPORTING SUPPLEMENTARY UPLINK FREQUENCIES IN NEXT GENERATION MOBILE COMMUNICATION SYSTEM

(71) Applicant: Samsung Electronics Co., Ltd., Suwon-si (KR)

(72) Inventors: Sangbum Kim, Suwon-si (KR); Jaehyuk Jang, Suwon-si (KR); Soenghun Kim, Suwon-si (KR); Alexander Sayenko, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/148,344

(22) Filed: Dec. 29, 2022

(65) Prior Publication Data
US 2023/0140356 A1 May 4, 2023

Related U.S. Application Data

(63) Continuation of application No. 17/301,664, filed on Apr. 9, 2021, now Pat. No. 11,546,838, which is a (Continued)

(30) Foreign Application Priority Data

Aug. 11, 2017 (KR) .......................... 10-2017-0102623

(51) Int. Cl.
*H04W 48/02* (2009.01)
*H04W 48/12* (2009.01)
(Continued)

(52) U.S. Cl.
CPC .......... *H04W 48/12* (2013.01); *H04W 48/02* (2013.01); *H04W 52/38* (2013.01); (Continued)

(58) Field of Classification Search
CPC ..... H04W 48/02; H04W 48/12; H04W 48/16; H04W 52/365; H04W 52/367; H04W 52/38; H04W 72/0473; H04W 74/0833
See application file for complete search history.

(56) References Cited

U.S. PATENT DOCUMENTS

| 8,626,162 B2 | 1/2014 | Deshpande et al. |
| 9,107,183 B2 | 8/2015 | Anchan et al. |

(Continued)

FOREIGN PATENT DOCUMENTS

| CN | 103929795 A | 7/2014 |
| CN | 103999528 A | 8/2014 |

(Continued)

OTHER PUBLICATIONS

ISA/KR, "International Search Report," International Application No. PCT/KR2018/009158, Nov. 16, 2018, 3 pages.

(Continued)

*Primary Examiner* — Alpus Hsu

(57) ABSTRACT

The present disclosure relates to a communication scheme and system for converging a 5th generation (5G) communication system and a 4th generation (4G) system. A UE performs a random access on a supplementary uplink (SUL) frequency, and transmits a physical uplink control channel (PUCCH) and a physical uplink shared channel (PUSCH) on the SUL frequency. A Next Generation NodeB (gNB) determines to use a New Radio (NR) uplink (UL) frequency for PUSCH transmissions, and transmits PUSCH configuration information for the NR UL to the UE. The UE transmits a PUSCH on the NR UL but still transmits the PUCCH on the SUL frequency.

16 Claims, 14 Drawing Sheets

Related U.S. Application Data continuation of application No. 16/101,303, filed on Aug. 10, 2018, now Pat. No. 10,979,967.

(51) Int. Cl.
    *H04W 52/38*      (2009.01)
    *H04W 72/044*     (2023.01)
    *H04W 74/08*      (2024.01)
    *H04W 74/0833*    (2024.01)
    *H04W 48/16*      (2009.01)
    *H04W 52/36*      (2009.01)
    *H04W 84/04*      (2009.01)
    *H04W 88/06*      (2009.01)

(52) U.S. Cl.
    CPC ... *H04W 72/0473* (2013.01); *H04W 74/0833* (2013.01); *H04W 48/16* (2013.01); *H04W 52/365* (2013.01); *H04W 52/367* (2013.01); *H04W 84/042* (2013.01); *H04W 88/06* (2013.01)

(56) References Cited

U.S. PATENT DOCUMENTS

| | | | |
|---|---|---|---|
| 9,131,468 B2 * | 9/2015 | Lee | H04W 36/24 |
| 9,338,811 B2 | 5/2016 | Schmidt et al. | |
| 9,344,887 B2 | 5/2016 | Turtinen et al. | |
| 9,392,531 B2 | 7/2016 | Pinheiro et al. | |
| 9,408,134 B2 | 8/2016 | Anchan et al. | |
| 9,414,421 B2 | 8/2016 | Turtinen et al. | |
| 9,560,656 B2 | 1/2017 | Damnjanovic et al. | |
| 9,572,133 B2 | 2/2017 | Lin et al. | |
| 9,591,460 B2 | 3/2017 | Anchan | |
| 9,775,011 B2 | 9/2017 | Pinheiro et al. | |
| 9,998,980 B2 | 6/2018 | Youn et al. | |
| 10,154,454 B2 | 12/2018 | Zhang et al. | |
| 2011/0216732 A1 | 9/2011 | Maeda et al. | |
| 2013/0045706 A1 | 2/2013 | Hsu | |
| 2013/0083753 A1 | 4/2013 | Lee et al. | |
| 2013/0215742 A1 | 8/2013 | Sirotkin et al. | |
| 2014/0128029 A1 | 5/2014 | Fong et al. | |
| 2014/0171061 A1 | 6/2014 | Larmo et al. | |
| 2014/0171096 A1 | 6/2014 | Hwang et al. | |
| 2014/0233448 A1 | 8/2014 | Yun et al. | |
| 2015/0055447 A1 | 2/2015 | Jamadagni et al. | |
| 2015/0119015 A1 | 4/2015 | Gai et al. | |
| 2015/0341912 A1 | 11/2015 | Kim et al. | |
| 2016/0100449 A1 | 4/2016 | Jang et al. | |
| 2017/0006621 A1 | 1/2017 | Jung et al. | |
| 2017/0064693 A1 | 3/2017 | Kim et al. | |
| 2017/0094570 A1 | 3/2017 | Kim et al. | |
| 2017/0118701 A1 | 4/2017 | Kim et al. | |
| 2017/0201939 A1 | 7/2017 | Lee et al. | |
| 2018/0146404 A1 | 5/2018 | Zhang et al. | |
| 2018/0242224 A1 | 8/2018 | Pinheiro et al. | |
| 2018/0332649 A1 | 11/2018 | Fan et al. | |
| 2019/0021043 A1 | 1/2019 | Youn et al. | |
| 2019/0021064 A1 | 1/2019 | Ryu et al. | |
| 2019/0037417 A1 | 1/2019 | Lei et al. | |
| 2019/0045368 A1 | 2/2019 | Zhou et al. | |
| 2019/0058997 A1 | 2/2019 | Futaki et al. | |
| 2019/0246332 A1 | 8/2019 | Berggren et al. | |
| 2019/0268761 A1 | 8/2019 | Hong | |
| 2019/0357125 A1 | 11/2019 | Mildh et al. | |
| 2020/0396654 A1 * | 12/2020 | Freda | H04W 36/06 |
| 2021/0022176 A1 * | 1/2021 | Yang | H04L 5/0098 |
| 2021/0051468 A1 * | 2/2021 | Baskaran | H04W 48/16 |

FOREIGN PATENT DOCUMENTS

| | | |
|---|---|---|
| CN | 104186012 A | 12/2014 |
| CN | 104244194 A | 12/2014 |
| CN | 105099627 A | 11/2015 |
| CN | 105491682 A | 4/2016 |
| CN | 106465369 A | 2/2017 |
| WO | 2014194748 A1 | 12/2014 |
| WO | 2016195617 A1 | 12/2016 |
| WO | 2018142303 A1 | 8/2018 |

OTHER PUBLICATIONS

Ericsson, "CN selection when accessing," Tdoc R2-1704177 (updated of R2-1702561), 3GPP TSG-RAN WG2 #98, Hangzhou, China, May 15-19, 2017, 3 pages.

Huawei, "Cell selection for Option 3,7 and 2,4 capable UE," R2-1700182, 3GPP TSG-RAN WG2 NR Ad Hoc, Spokane, USA, Jan. 17-19, 2017, 4 pages.

Huawei, et al., "Access Control for UE accessing 5GC via LTE," R2-1705712, 3GPP TSG-RAN WG2 #98, Hangzhou, China, May 15-19, 2017, 4 pages.

Zte, et al., "Further consideration on the eLTE," R2-1702020, 3GPP TSG-RAN WG2 Meeting #97, Athens, Greece, Feb. 13-17, 2017, 3 pages.

Supplementary European Search Report in connection with European Application No. 18843953.3 dated Jun. 30, 2020, 12 pages.

Ericsson, "System information structure and contents," Tdoc R2-1706495, Update of R2-1704386, 3GPP TSG-RAN WG2 Ad Hoc on NR#2, Qingdao, China, Jun. 27-29, 2017, 9 pages.

Samsung, "System Information Signalling Design in NR," R2-163371, 3GPP TSG-RAN WG2 Meeting #94, Nanjing, China, May 23-27, 2016, 7 pages.

Qualcomm Incorporated, "Preventing Legacy LTE UEs from camping on eLTE Cells PLMNs connected to New 5G Core Network only, " R2-1707786, 3GPP TSG-RAN2 Meeting #99, Berlin, Germany, Aug. 21-25, 2017, 7 pages.

Decision of Rejection dated Jun. 2, 2023, in connection with Korean Patent Application No. 10-2020-7004062, 8 pages.

Notification of Fulfilling of Registration Formality dated Sep. 1, 2023, in connection with Chinese Application No. 201880052296.8, 10 pages.

The First Office Action dated Feb. 28, 2023, in connection with Chinese Patent Application No. 201880052296.8, 19 pages.

* cited by examiner

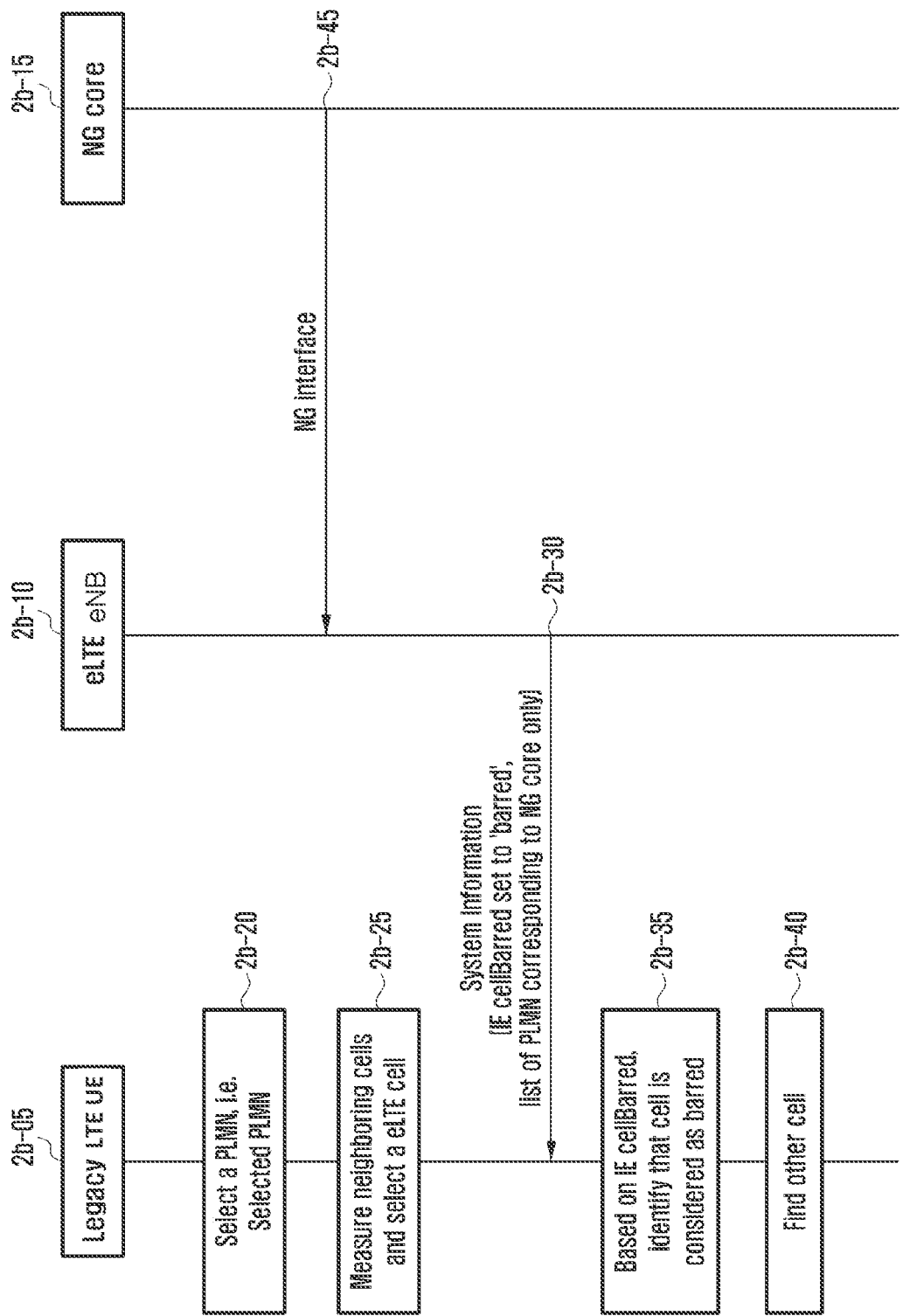

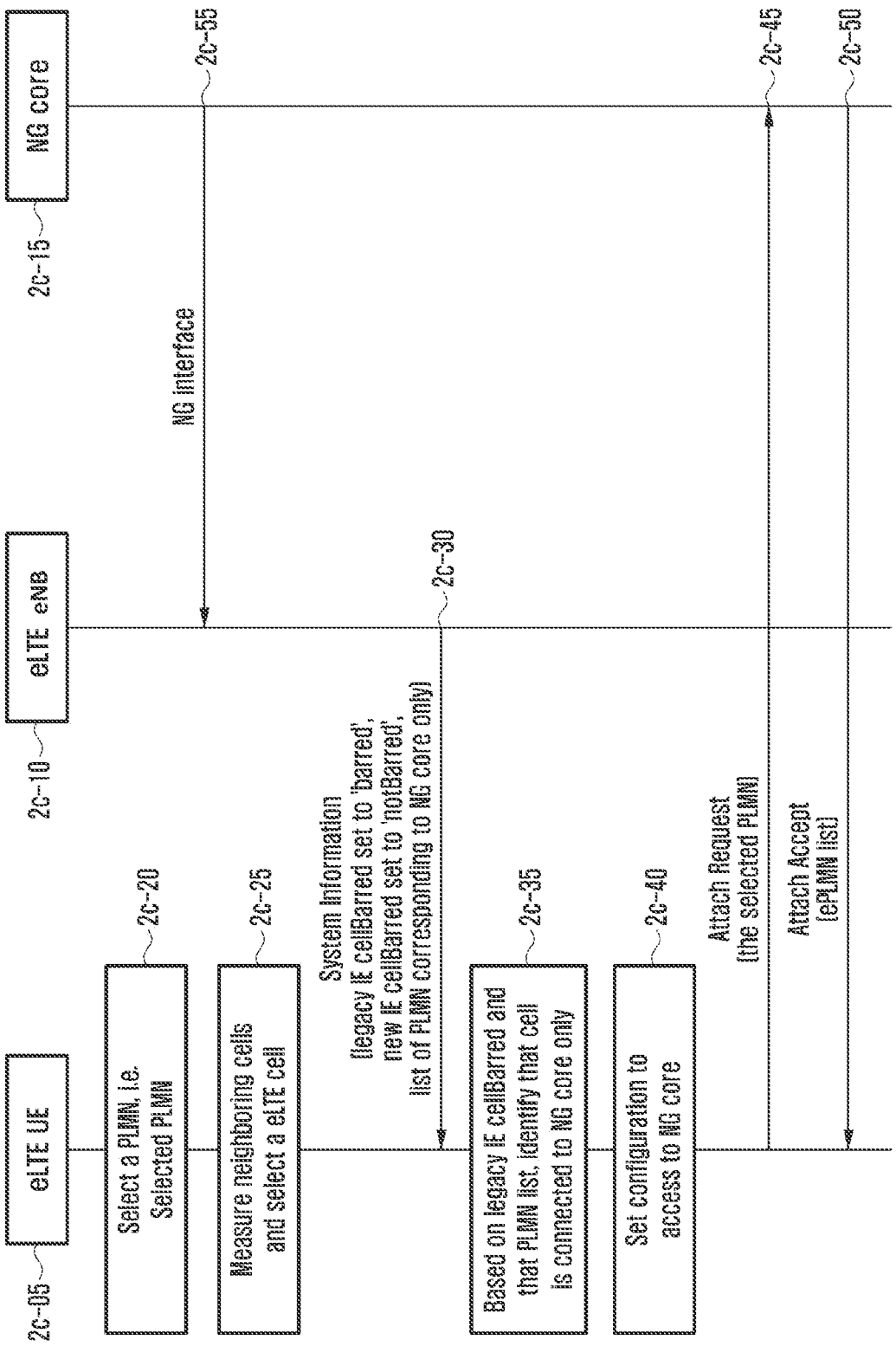

METHOD AND APPARATUS FOR SUPPORTING SUPPLEMENTARY UPLINK FREQUENCIES IN NEXT GENERATION MOBILE COMMUNICATION SYSTEM

CROSS-REFERENCE TO RELATED APPLICATIONS

This application is a continuation of U.S. application Ser. No. 17/301,664, filed Apr. 9, 2021, now U.S. Pat. No. 11,546,838, which is a continuation of U.S. application Ser. No. 16/101,303, filed Aug. 10, 2018, now U.S. Pat. No. 10,979,967, which is based on and claims priority under 35 U.S.C. § 119(a) to Korean Patent Application No. 10-2017-0102623, filed on Aug. 11, 2017, in the Korean Intellectual Property Office, the disclosures of which are incorporated by reference herein in their entirety.

BACKGROUND

1. Field

The present disclosure relates to a method and apparatus for supporting supplementary uplink frequencies between a terminal and a base station in a next generation mobile communication system.

2. Description of Related Art

In order to meet the increasing demand for wireless data traffic since the commercialization of $4^{th}$ generation (4G) communication systems, the development focus is on the $5^{th}$ generation (5G) or pre-5G communication system. For this reason, the 5G or pre-5G communication system is called a beyond 4G network communication system or post long-term evolution (LTE) system.

Implementation of the 5G communication system in millimeter wave (mmWave) frequency bands (e.g., 60 GHz bands) is being considered to accomplish higher data rates. In order to increase the propagation distance by mitigating propagation loss in the 5G communication system, discussions are underway about various techniques such as beamforming, massive multiple-input multiple output (MIMO), full dimensional MIMO (FD-MIMO), array antenna, analog beamforming, and large-scale antenna.

Also, in order to enhance network performance of the 5G communication system, developments are underway of various techniques such as evolved small cell, advanced small cell, cloud radio access network (RAN), ultra-dense network, device-to-device (D2D) communication, wireless backhaul, moving network, cooperative communication, coordinated multi-points (CoMP), and interference cancellation.

Furthermore, the ongoing research includes the use of hybrid frequency shift keying (FSK) and quadrature amplitude modulation (QAM) {FQAM} and sliding window superposition coding (SWSC) as advanced coding modulation (ACM), filter bank multi-carrier (FBMC), non-orthogonal multiple access (NOMA), and sparse code multiple access (SCMA).

Meanwhile, the Internet is evolving from a human-centric communication network in which information is generated and consumed by humans to the Internet of things (IoT) in which distributed things or components exchange and process information. The combination of the cloud server-based big data processing technology and the IoT begets Internet of everything (IoE) technology. In order to secure the sensing technology, wired/wireless communication and network infrastructure, service interface technology, and security technology required for implementing the IoT, recent research has focused on sensor network, machine-to-machine (M2M), and machine-type communication (MTC) technologies.

In the IoT environment, it is possible to provide an intelligent Internet Technology that is capable of collecting and analyzing data generated from connected things to create new values for human life. The IoT can be applied to various fields such as smart home, smart building, smart city, smart car or connected car, smart grid, health care, smart appliance, and smart medical service through legacy information technology (IT) and convergence of various industries.

Thus, there are various attempts to apply the IoT to the 5G communication system. For example, the sensor network, M2M, and MTC technologies are implemented by means of the 5G communication technologies such as beamforming, MIMO, and array antenna. The application of the aforementioned cloud RAN as a big data processing technology is an example of convergence between the 5G and IoT technologies.

Typically, in a mobile communication system, there is a coverage mismatch between downlink (DL) and uplink (UL), i.e., a DL coverage is broader than an UL coverage, and in order to overcome this coverage mismatch problem, the effective DL coverage is reduced in size for matching with the UL coverage. In this respect, in the next generation mobile communication system there is a need of a method and apparatus for enabling a terminal to use a UL frequency for broader coverage without such performance limitation.

SUMMARY

The present disclosure aims to provide a method for allowing a terminal to use a UL frequency for better service coverage to overcome the performance limitation caused by a UL-DL coverage mismatch that arises from a maximum transmit power restriction of the terminal in a next generation mobile communication system.

Also, the present disclosure aims to provide a method for preventing a legacy terminal from camping on an enhanced LTE (eLTE) base station that is connected to only a next generation (NG) core by combining a legacy information element (IE) and a new IE carried in system information broadcast by the base station in a next generation mobile communication system.

In accordance with an aspect of the present disclosure, a method for operating a base station capable of communicating with at least one of a first core network and a second core network in a wireless communication system comprises generating first information indicating whether a first type of terminal is barred from access to the base station and second information indicating whether a second type of terminal is barred from access to the base station, wherein the first type of terminal is capable of communicating with the first core network, and the second type of terminal is capable of communicating with both the first core network and the second core network; and transmitting a message including the generated first and second information to at least one terminal.

In accordance with another aspect of the present disclosure, a method by a terminal in a wireless communication system comprises identifying whether the terminal is a first type of terminal or a second type of terminal, wherein the first type of terminal is capable of communicating with a first core network, and the second type of terminal is capable of communicating with both the first core network and a second core network; receiving, from a base station, a message including first information indicating whether an access to the base station is barred for the first type and second information indicating whether an access to the base station is barred for the second type of terminal; and determining whether to access to the base station based on an identified type of terminal and one of the first information or the second information associated with the identified type of the terminal.

In accordance with still another aspect of the present disclosure, a base station capable of communicating with at least one of a first core network and a second core network in a wireless communication system, comprises a transceiver configured to transmit and receive signals; and a controller configured to generating first information indicating whether a first type of terminal is barred from access to the base station and second information indicating whether a second type is barred from access to the base station, wherein the first type of terminal is capable of communicating with the first core network, and the second type of terminal is type capable of communicating with both the first core network and the second core network; and transmitting, via the transceiver to at least one terminal, a message including the generated first and second information.

In accordance with yet still another aspect of the present disclosure, a terminal in a wireless communication system, comprises a transceiver configured to transmit and receive signals; and a controller configured to: identifying whether a type of the terminal is a first type or a second type, a terminal of the first type capable of communicating with a first core network, and a terminal of the second type capable of communicating with both the first core network and a second core network; receiving, via the transceiver from a base station, a message including first information indicating whether an access to the base station by the terminal of the first type is barred and second information indicating whether an access to the base station by the terminal of the second type is barred; and determining whether to access to the base station based on one of the first information and the second information associated with the identified type of the terminal.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 2B is a signal flow diagram illustrating a procedure of prohibiting access of UEs that are not supported by a next generation mobile communication network according to an embodiment of the present disclosure;

FIG. 2C is a signal flow diagram illustrating a procedure of prohibiting access of a UE being supported by a next generation mobile communication system according to an embodiment of the present disclosure;

DETAILED DESCRIPTION

Figure 1A:
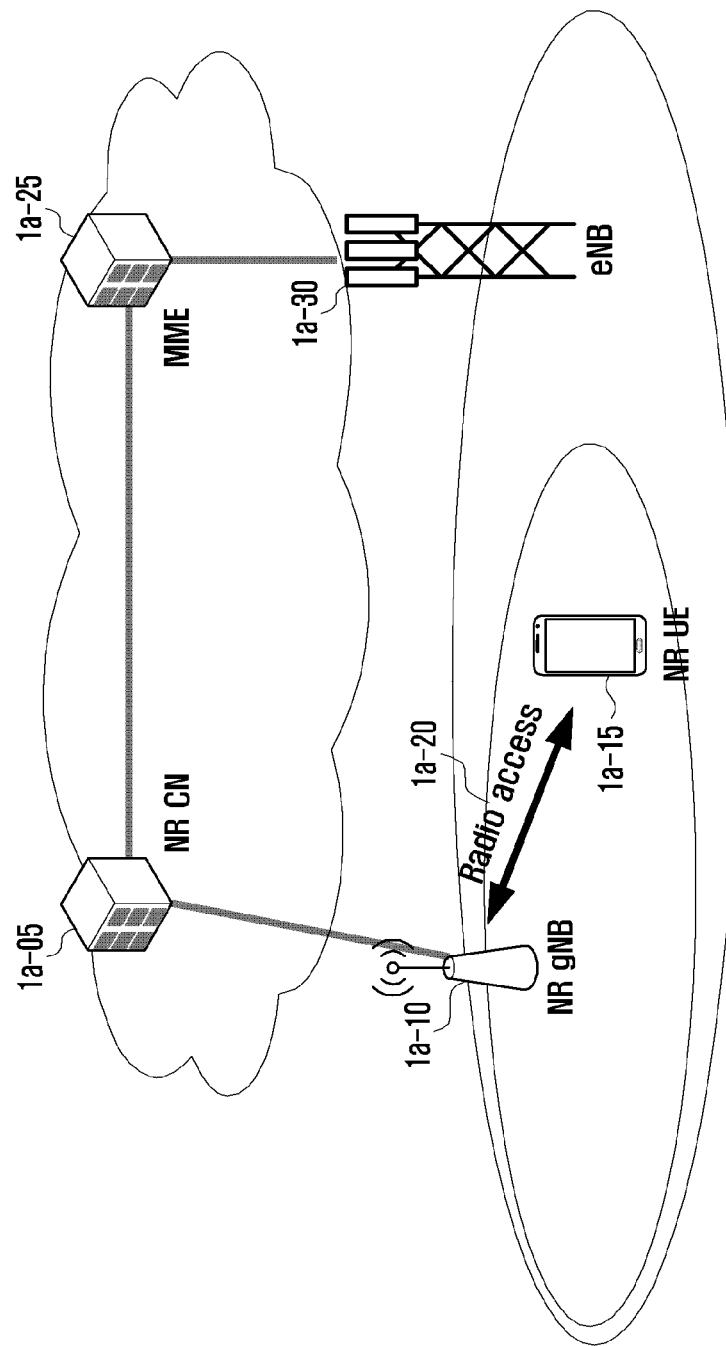
FIG. 1A is an exemplary diagram illustrating architecture of a next generation mobile communication system.

FIGS. 1A through 2F, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device Exemplary embodiments of the present disclosure are described in detail with reference to the accompanying drawings. Detailed descriptions of well-known functions and structures incorporated herein may be omitted to avoid obscuring the subject matter of the present disclosure. Further, the following terms are defined in consideration of the functionality in the present disclosure, and they may vary according to the intention of a user or an operator, usage, etc. Therefore, the definition should be made on the basis of the overall content of the present specification.

Advantages and features of the present disclosure and methods of accomplishing the same may be understood more readily by reference to the following detailed description of exemplary embodiments and the accompanying drawings. The present disclosure may, however, be embodied in many different forms and should not be construed as being limited to the exemplary embodiments set forth herein. Rather, these exemplary embodiments are provided so that this disclosure will be thorough and complete and will fully convey the concept of the disclosure to those skilled in the art, and the present disclosure will only be defined by the appended claims. Like reference numerals refer to like elements throughout the specification.

First Embodiment

FIG. 1A is an exemplary diagram illustrating an exemplary architecture of a next generation mobile communication system.

In reference to FIG. 1A, a radio access network of the next generation mobile communication system includes a new radio node B (hereinafter, interchangeably referred to as NR NB) 1a-10 and a new radio core network (NR CN) 1a-05. A new radio user equipment (NR UE) 1a-15 (hereinafter, interchangeably referred to as terminal) accesses an external network via the NR NB 1a-10 and the NR CN 1a-05.

In FIG. 1A, the NR NB 1a-10 corresponds to an evolved node B (eNB) of a legacy LTE system. The NR UE 1a-15 connects to the NR NB 1a-10, which provides more sophisticated service in comparison with the legacy eNB. In the next generation mobile communication system where all user traffic is served through shared channels, there is a need of an entity for collecting UE-specific status information (such as buffer status, power headroom status, and channel status) and scheduling the UEs based on the collected information, and the NR NB 1a-10 takes charge of such functions.

Typically, one NR NB hosts multiple cells. In order to meet the data rate requirement that is higher than that for legacy LTE, it is necessary to secure a maximum bandwidth broader than ever before by employing advanced technologies such as orthogonal frequency division multiplexing (OFDM) as a radio access scheme and beamforming. It may be possible to employ an adoptive modulation and coding (AMC) technology to determine a modulation scheme and a channel coding rate in adaptation to the channel condition of the UE.

The NR CN 1a-05 is responsible for mobility management, bearer setup, and QoS setup. The NR CN 1a-05 is responsible for other control functions as well as UE mobility management functions in connection with a plurality of NR NBs. The next generation mobile communication system may interoperate with legacy LTE systems in such a way as to connect the NR CN 1a-05 to a mobility management entity (MME) 1a-25 through a network interface. The MME 1a-25 is connected to an eNB 1a-30 as a legacy base station.

Figure 1B:
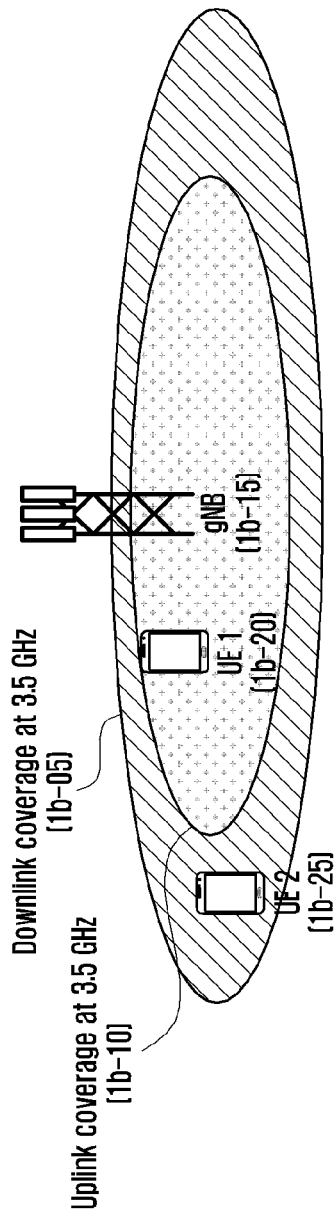
FIGS. 1BA-1BB are exemplary conceptual views for explaining supplementary UL frequency that is employed in the embodiments of the present disclosure.
Figure 1B:
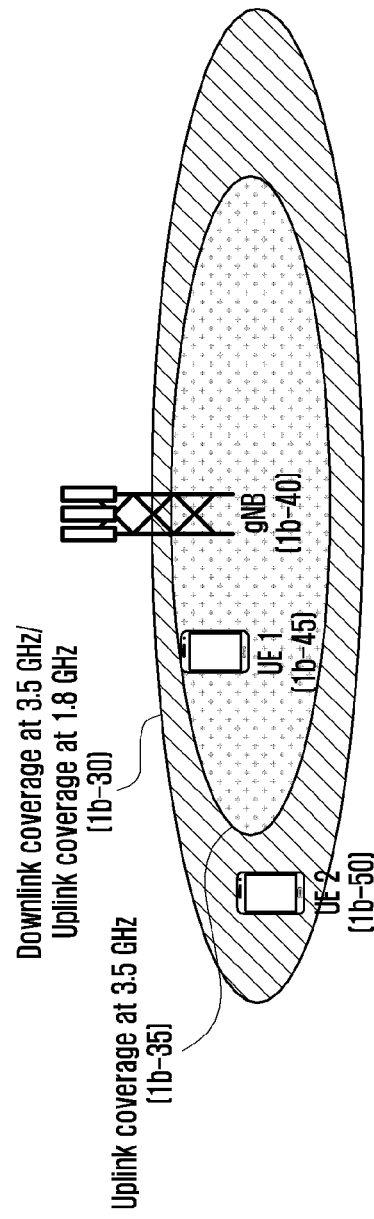

FIG. 1BA-1BB illustrate exemplary embodiments utilizing a supplementary UL frequency that is employed in the embodiments of the present disclosure.

In a mobile communication system, a UL-DL coverage mismatch may occur. The UL-DL coverage mismatch occurs because of a difference in channel characteristics between UL and DL or a limitation of the maximum transmit power of a terminal. In an exemplary case of a 3.5 GHz time division duplex (TDD) system, the DL coverage 1b-05 is broader than the UL coverage 1b-10.

In this case, there is no problem in that a first UE 1b-20 receives services in both the UL and DL, but a problem may occur in that the second UE 1b-25 transmits UL data to the gNB 1b-15. In order to mitigate the problem that arises from such coverage mismatch, the effective DL coverage is reduced in size for matching with the UL coverage. That is, although a wider service area can be provided in the downlink, the service area of the downlink is limited to a service area of the uplink.

In the next generation mobile communication system, a method is employed for a UE to use a UL frequency for broader coverage to overcome the performance limitation that arises from such mismatch. That is, the UE is capable of using a supplementary UL frequency of 1.8 giga-Hertz (GHz) in addition to the UL frequency of 3.5 GHz as denoted by reference number of 1b-30. The supplementary UL frequency is referred to as SUL frequency. By the nature of frequency, the propagation distance of a radio signal increases as the frequency decreases. This means that a frequency of 1.8 GHz that is lower than the frequency of 3.5 GHz expands the coverage. As a consequence, the second UE 1b-50 is capable of transmitting data to the gNB 1b-40 successfully using the UL frequency of 1.8 GHz as denoted by reference number 1b-30.

Regardless of the coverage issue, the first UE 1b-45 may select one of the 1.8 GHz frequency band or the 3.5 GHz frequency band for the purpose of distributing UL access congestion because it can use both the 1.8 GHz and 3.5 GHz UL frequency bands. The SUL frequency may be an LTE frequency.

In the case where a UE uses one of the SUL frequency and the NR UL frequency, there is a need of an operation for switching from the NR UL frequency to the SUL frequency at an NR UL coverage boundary. This may increase signaling overhead and cause a service breakdown. There is therefore a need of minimizing the number of UL frequency switching operations.

The present disclosure provides a method for using the NR UL frequency in the NR UL coverage area in which the SUL frequency is regarded as the default UL frequency.

Figure 1C:
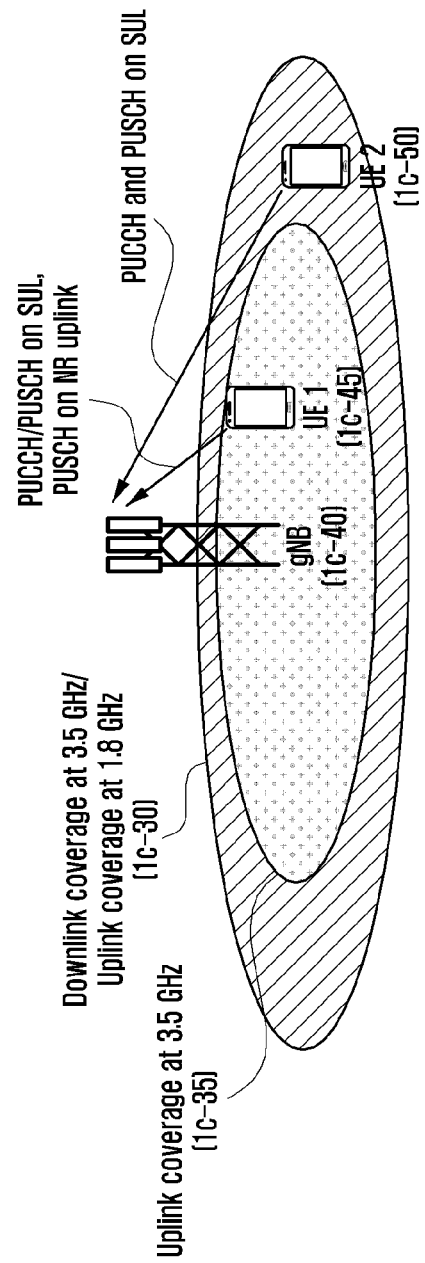
FIG. 1C is an exemplary conceptual diagram for explaining a method for use of a supplementary UL frequency (SUL) frequency and an NR UL in a next generation mobile communication system according to an embodiment of the present disclosure.

FIG. 1C is an exemplary conceptual diagram for illustrating an exemplary method for use of an SUL frequency and an NR UL in a next generation mobile communication system according to an embodiment of the present disclosure.

The SUL frequency may provide a UL coverage similar in size to the DL coverage. For example, the SUL frequency of 1.8 GHz provides a UL coverage similar to that of the NR DL frequency of 3.5 GHz. Meanwhile, the NR UL frequency of 3.5 GHz cannot provide sufficient coverage.

The present disclosure may be characterized in that a UE performs a random access on an SUL frequency to transmit at least a physical uplink control channel (PUCCH). The SUL frequency is also used as a default frequency for transmitting a physical uplink shared channel (PUSCH) and, in response to a UE's request or gNB's command, it may be possible to use the NR UL frequency in addition to or instead of the SUL frequency for the PUSCH (data) transmission.

Figure 1D:
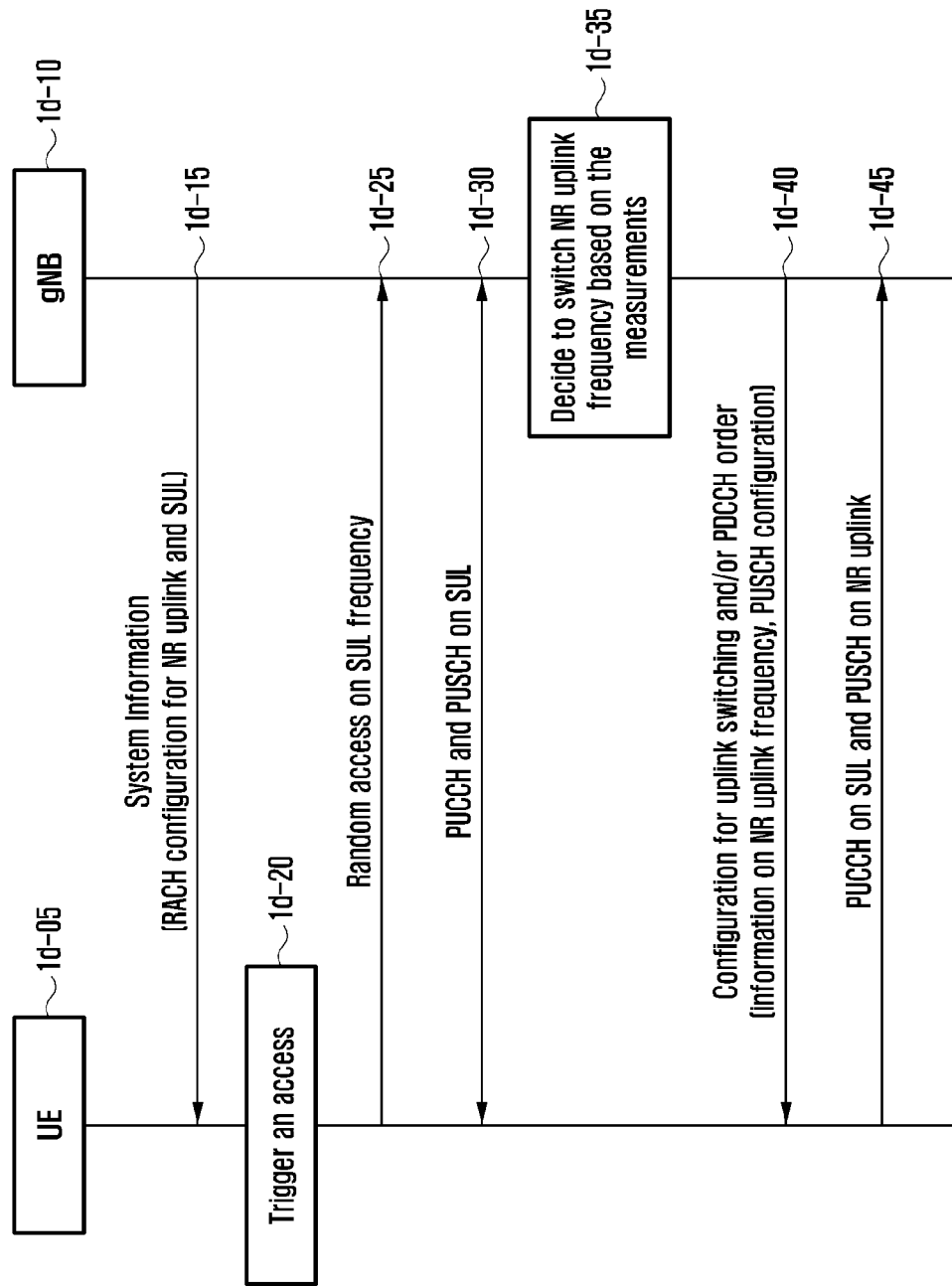
FIG. 1D is a signal flow diagram illustrating a procedure for use of an SUL frequency and an NR UL frequency according to an embodiment of the present disclosure.

FIG. 1D is a signal flow diagram illustrating a procedure for use of a SUL frequency and an NR UL frequency according to an embodiment of the present disclosure.

At step 1d-15, a gNB 1d-10 supporting the SUL frequency broadcasts system information including SUL frequency-specific random access channel (RACH) configuration information for use by the UEs located within its coverage. The system information may further include information on maximum transmit power value P_max required on the NR UL frequency and SUL frequency. A UE 1d-05 may determine whether it is located within the frequency-specific coverages based on the value of P_max.

The UE 1d-05 triggers an access at step 1d-20. The UE 1d-05 performs a random access on the SUL frequency at step 1d-25. The UE 1d-05 transits PUCCH and PUSCH on the SUL frequency at step 1d-30.

According to a request generated by the gNB 1d-10 or the UE 1d-05, the gNB 1d-10 determines to use the NR UL frequency for PUSCH transmission at step 1d-35. This determination may be made by the gNB 1d-10 based on a cell-specific measurement information or buffer status report (BSR). This determination may be made by the UE 1d-05 when a UE's maximum transmit power (P_powerclass) value is greater than the P_max for the NR UL and, in this case, the UE 1d-05 may report the determination result to the gNB 1d-10. If the above condition is fulfilled, this means that the UE 1d-05 is located within the NR UL coverage.

The gNB 1d-10 transmits PUSCH configuration information for the NR UL to the UE 1d-05 at step 1d-40. The configuration information may include NR UL frequency information and an indication instructing the UE 1d-05 to perform random access. The configuration information may include an indication instructing the UE 1d-05 to perform random access with a physical downlink control channel (PDCCH) order. The PDCCH order may include the NR UL frequency information and RACH configuration information.

After completing the random access, the UE 1d-05 transmits PUSCH on the NR UL at step 1d-45. The random access operation may be omitted. However, the PUCCH is still transmitted on the SUL frequency. In the present disclosure, the RACH configuration information denotes physical random access channel (PRACH) radio resource information, preamble information, and preamble transmit power information.

Figure 1E:
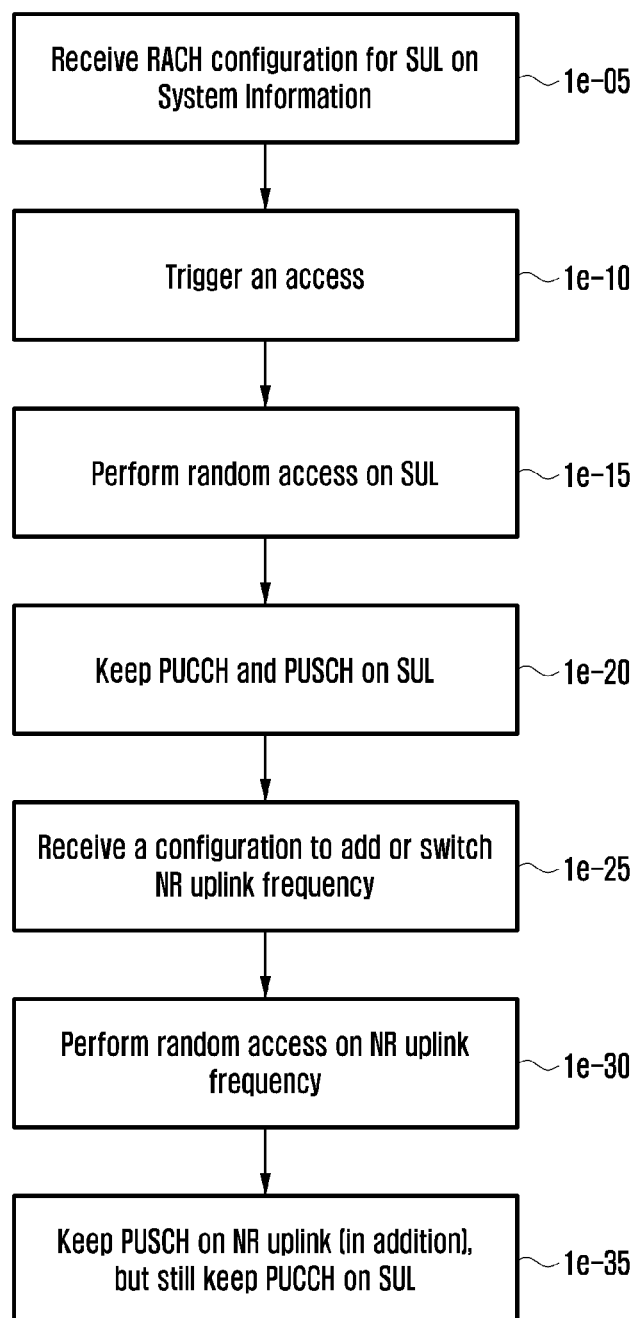
FIG. 1E is an exemplary flowchart illustrating operations of a UE according to an embodiment of the present disclosure.

FIG. 1E is an exemplary flowchart illustrating an operation of a UE according to an embodiment of the present disclosure.

At step 1e-05, the UE receives RACH configuration information for an SUL frequency via system information broadcast by a gNB. At step 1e-10, the UE triggers an access. The UE performs a random access on the SUL frequency. At step 1e-20, the UE transmits both the PUCCH and PUSCH on the SUL frequency.

At step 1e-25, the UE receives, from the gNB, an instruction to add or switch to an NR UL for PUSCH transmission. This instruction is carried by a radio resource control (RRC) connection reconfiguration message including PUSCH configuration information, information on whether to perform a random access, and NR UL frequency information. In order to instruct to perform the random access, a PDCCH order is separately used. The PDCCH order includes the NR UL frequency information and RACH configuration information.

At step 1e-30, the UE performs a random access on the NR UL. The random access operation may be omitted. At step 1e-35, the UE transmits the PUSCH on the NR UL after completing the random access.

Figure 1F:
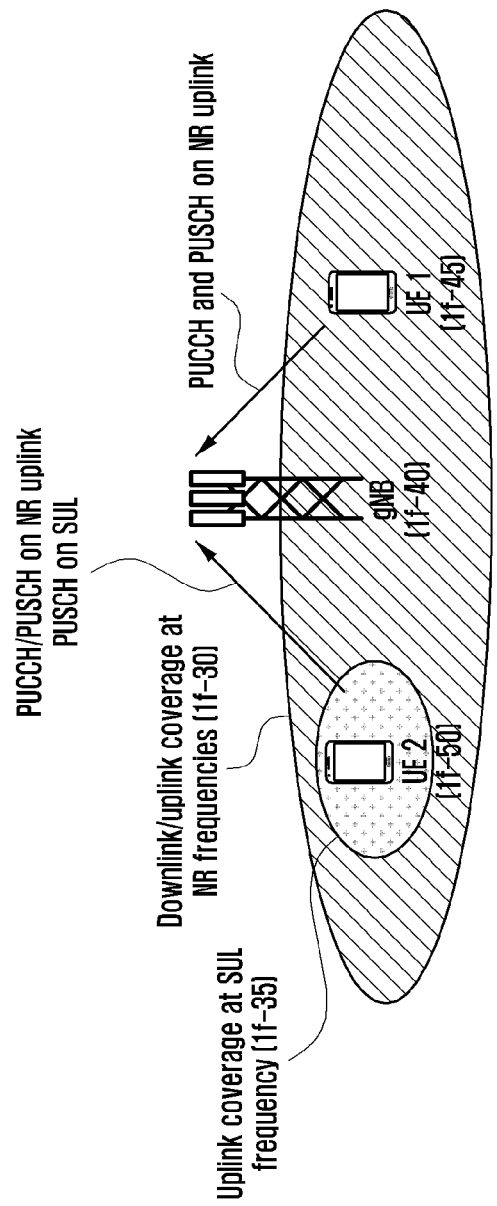
FIG. 1F is an exemplary conceptual diagram for explaining a method for use of an SUL frequency according to another embodiment of the present disclosure.

FIG. 1F is an exemplary conceptual diagram for illustrating an exemplary method for use of an SUL frequency according to another embodiment of the present disclosure.

It may be possible to design the UL and DL coverages to be matched using the NR frequency. However, there may be still a weak signal strength area such as a basement and a subway. In such an area, the UL signal is likely to be much weaker. Accordingly, it is preferred to use the SUL frequency for UL transmission in such an area.

In such a scenario, the NR UL frequency is used as a default UL frequency for PUCCH and PUSCH transmission, while the SUL frequency is used for PUCCH and PUSCH transmission in the weak UL signal strength area. However, the SUL frequency may be used for PUSCH transmission because the PUCCH can be in the weak signal strength area by nature of its robust reception performance in comparison with PUSCH. In this scenario, the roles of the SUL and NR UL frequencies are opposite to those in FIGS. 1D and 1E. If the PUSCH reception performance drops in a certain area while transmitting PUCCH and PUSCH on the NR UL, the gNB configures to the UE to transmit the PUSCH on the SUL frequency. This configuration may be performed via the PDCCH order, which includes the SUL frequency information and RACH configuration information.

Figure 1G:
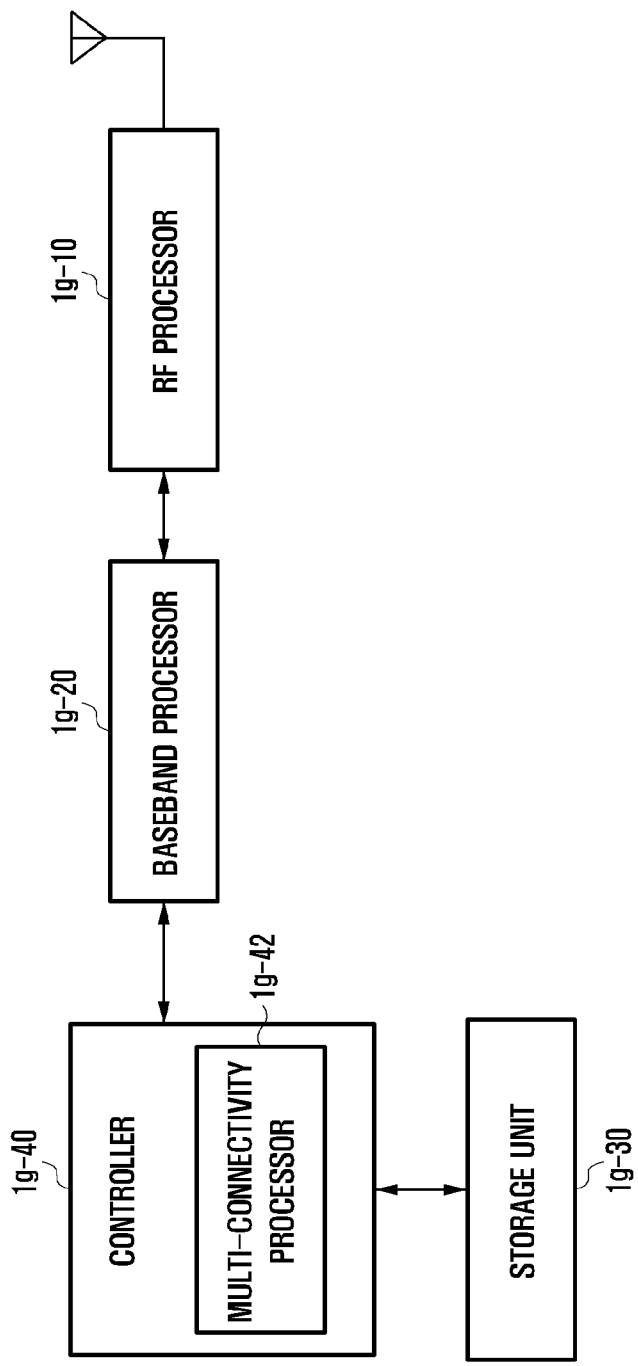
FIG. 1G is an exemplary block diagram illustrating a configuration of a UE according to an embodiment of the present disclosure.

FIG. 1G is an exemplary block diagram illustrating a configuration of a UE according to an embodiment of the present disclosure.

In reference to FIG. 1G, the UE includes a radio frequency (RF) processor 1g-10, a baseband processor 1g-20, a storage unit 1g-30, and a controller 1g-40.

The RF processor 1g-10 has a function for transmitting/receiving a signal over a radio channel such as band conversion and amplification of the signal. That is, the RF processor 1g-10 up-converts a baseband signal from the baseband processor 1g-20 to an RF band signal and transmits the RF signal via an antenna and down-converts the RF signal received via the antenna to a baseband signal. For example, the RF processor 1g-10 may include a transmission filter, a reception filter, an amplifier, a mixer, an oscillator, a digital-to-analog converter (DAC), and an analog-to-digital converter (ADC).

Although one antenna is depicted in the drawing, the UE may be provided with a plurality of antennas. The RF processor 1g-10 may also include a plurality of RF chains.

The RF processor 1g-10 may perform beamforming. For beamforming, the RF processor 1g-10 may adjust the phase and size of a signal to be transmitted/received by means of the antennas or antenna elements in phase and size. The RF processor 1g-1—may be configured to support a MIMO scheme with which the UE can receive multiple layers simultaneously The baseband processor 1g-20 has a baseband signal-bit string conversion function according to a physical layer standard of the system. For example, in a data transmission mode, the baseband processor 1g-20 performs encoding and modulation on the transmission bit string to generate complex symbols. In a data reception mode, the baseband processor 1g-20 performs demodulation and decoding on the baseband signal from the RF processor 1g-10 to recover the transmitted bit string. In the case of using an OFDM scheme for data transmission, the baseband processor 1g-20 performs encoding and modulation on the transmission bit string to generate complex symbols, maps the complex symbols to subcarriers, performs inverse fast Fourier transform (IFFT) on the symbols, and inserts a cyclic prefix (CP) into the symbols to generate OFDM symbols.

In the data reception mode, the baseband processor 1g-20 splits the baseband signal from the RF processor 1g-10 into OFDM symbols, performs fast Fourier transform (FFT) on the OFDM symbols to recover the signals mapped to the subcarriers, and performs demodulation and decoding on the signals to recover the transmitted bit string.

The baseband processor 1g-20 and the RF processor 1g-10 process the transmission and reception signals as described above. Accordingly, the baseband processor 1g-20 and the RF processor 1g-10 may be referred to as a transmitter, a receiver, a transceiver, or a communication unit. At least one of the baseband processor 1g-20 and the RF processor 1g-10 may include a plurality of communication modules for supporting different radio access technologies.

At least one of the baseband processor 1g-20 and the RF processor 1g-10 may also include multiple communication modules for processing the signals in different frequency bands. For example, the different radio access technologies may include a wireless local area network (WLAN) (e.g., Institute of Electrical and Electronics Engineers (IEEE) 802.11) and a cellular network (e.g., LTE). The different frequency bands may include a super high frequency (SHF) band (e.g., 2.NRHz and NRhz bands) and an mmWave band (e.g., 60 GHz).

The storage unit 1g-30 stores data such as basic programs for operation of the UE, application programs, and setting information. The storage unit 1g-30 may also store the information on a second access node for radio communication with a second radio access technology. The storage unit 1g-30 provides the stored information in response to a request from the controller 1g-40.

The controller 1g-40 controls overall operations of the UE. For example, the controller 1g-40 controls the baseband processor 1g-20 and the RF processor 1g-10 for transmitting and receiving signals. The controller 1g-40 writes and reads data to and from the storage unit 1g-40. For this purpose, the controller 1g-40 may include at least one processor. For example, the controller 1g-40 may include a communication processor (CP) for controlling communications and an application processor (AP) for controlling higher layer programs such as applications.

Figure 1H:
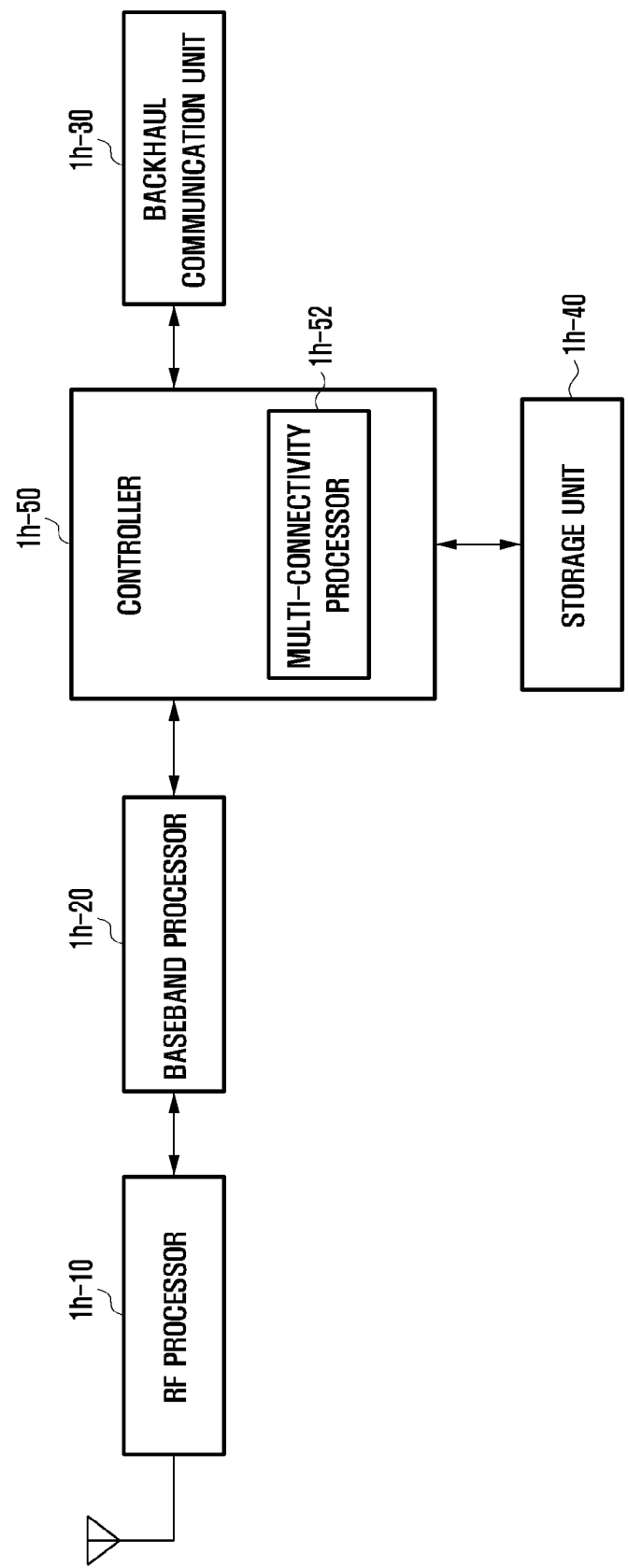
FIG. 1H is an exemplary block diagram illustrating a configuration of a Next Generation Node B (gNB) according to an embodiment of the present disclosure.

FIG. 1H is an exemplary block diagram illustrating a configuration of gNB according to an embodiment of the present disclosure.

In reference to FIG. 1H, the gNB includes an RF processor 1h-10, a baseband processor 1h-20, a backhaul communication unit 1h-30, a storage unit 1h-40, and a controller 1h-50.

The RF processor 1h-10 has a function for transmitting/receiving a signal over a radio channel such as band conversion and amplification of the signal. That is, the RF processor 1h-10 up-converts a baseband signal from the baseband processor 1h-20 to an RF band signal and transmits the RF signal via an antenna and down-converts the RF signal received via the antenna to a baseband signal. For example, the RF processor 1h-10 may include a transmission filter, a reception filter, an amplifier, a mixer, an oscillator, a DAC, and an ADC.

Although one antenna is depicted in the drawing, the gNB may be provided with a plurality of antennas. The RF processor 1h-10 may also include a plurality of RF chains. The RF processor 1i-10 may perform beamforming. For beamforming, the RF processor 1h-10 may adjust the phase and size of a signal to be transmitted/received by means of the antennas or antenna elements. The RF processor 1h-10 may be configured to transmit one or more layers for a downlink MIMO operation.

The baseband processor 1h-20 has a baseband signal-bit string conversion function according to a physical layer standard of the system. For example, in a data transmission mode, the baseband processor 1h-20 performs encoding and modulation on the transmission bit string to generate complex symbols. In a data reception mode, the baseband processor 1h-20 performs demodulation and decoding on the baseband signal from the RF processor 1h-10 to recover the transmitted bit string. In the case of using an OFDM scheme for data transmission, the baseband processor 1h-20 performs encoding and modulation on the transmission bit string to generate complex symbols, maps the complex symbols to subcarriers, performs inverse fast Fourier transform (IFFT) on the symbols, and inserts a cyclic prefix (CP) into the symbols to generate OFDM symbols.

In the data reception mode, the baseband processor 1h-20 splits the baseband signal from the RF processor 1h-10 into OFDM symbols, performs fast Fourier transform (FFT) on the OFDM symbols to recover the signals mapped to the subcarriers, and performs demodulation and decoding on the signals to recover the transmitted bit string. The baseband processor 1h-20 and the RF processor 1h-10 process the transmission and reception signals as described above. Accordingly, the baseband processor 1h-20 and the RF processor 1h-10 may be referred to as a transmitter, a receiver, a transceiver, or a communication unit.

The backhaul communication unit 1h-30 provides an interface for communication with other nodes in the network. That is, the backhaul communication unit 1h-30 converts a bit string to be transmitted from the gNB to another node, e.g., another gNB and core network, to a physical signal and converts a physical signal received from another node to a bit string.

The storage unit 1h-40 stores data such as basic programs for operation of the gNB, application programs, and setting information. The storage unit 1h-40 may also store the information on the bearers established for UEs and measurement results reported by the connected UEs. The storage unit 1h-40 may also store the information for use by a UE in determining whether to enable or disable multi-connectivity. The storage unit 1h-40 may provide the stored data in reference to a request from the controller 1h-50.

The controller 1h-50 controls overall operations of the gNB. For example, the controller 1h-50 controls the baseband processor 1h-20, the RF processor 1h-10, and the backhaul communication unit 1h-30 for transmitting and receiving signals. The controller 1h-50 writes and reads data to and from the storage unit 1h-40. For this purpose, the controller 1h-50 may include at least one processor.

Second Embodiment

Figure 2A:
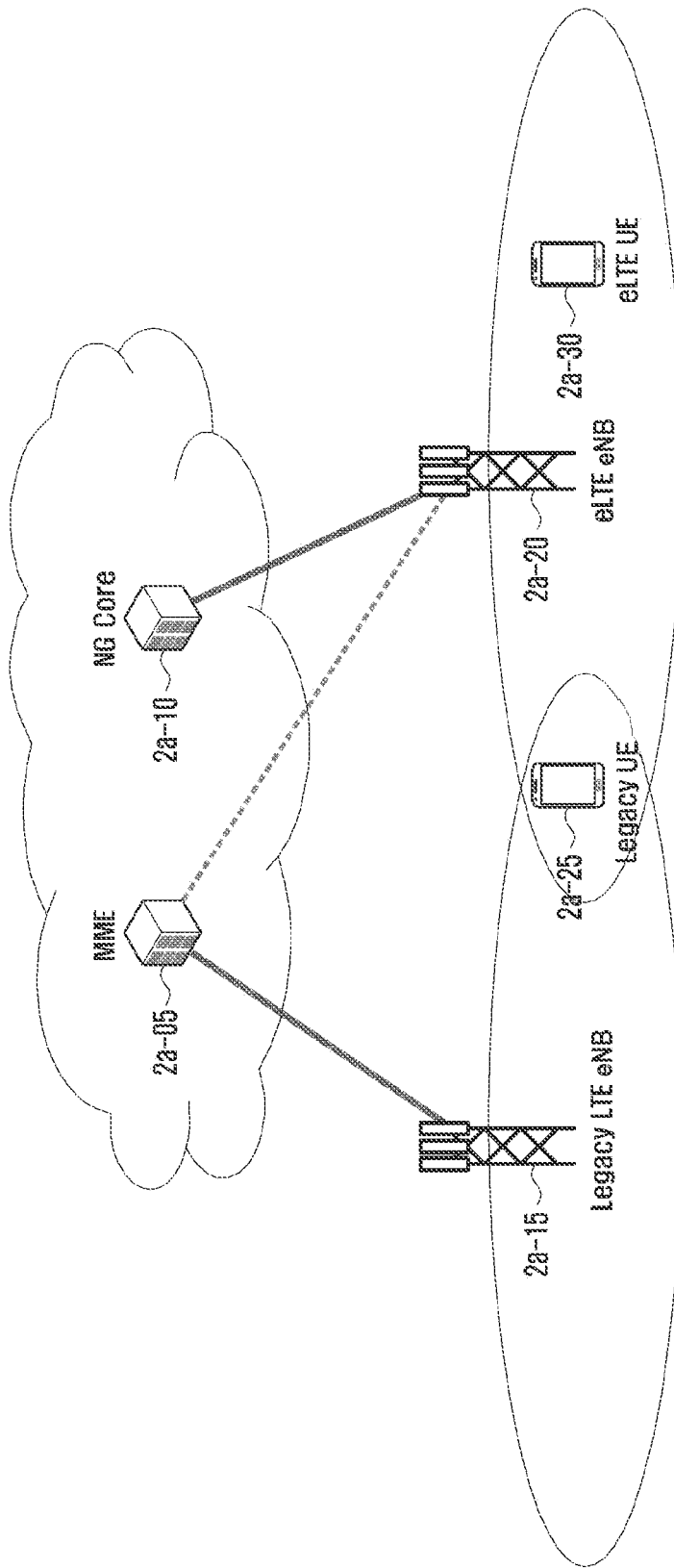
FIG. 2A is an exemplary diagram illustrating a next generation mobile communication network to which an LTE eNB is connected.

FIG. 2A is an exemplary diagram illustrating a next generation mobile communication network to which an LTE eNB is connected according to embodiments of the present disclosure.

A legacy LTE eNB 2a-15 connects to a mobility management entity (MME) 2a-05 as a network entity. It may be possible to upgrade a legacy LTE eNB such that the upgraded LTE eNB, as well as a next generation mobile communication base station, can connect to the next generation mobile communication network (NG core) 2a-10. The upgraded LTE eNB is referred to as evolved/enhanced LTE (eLTE) eNB 2a-20.

The eLTE eNB 2a-20 may connect to one or both of the legacy MME or next generation mobile communication network. If the eLTE eNB 2a-20 is only connected to the NG core, only an eLTE UE 2a-30 can connect to the eLTE eNB 2a-20 to communicate with the next generation mobile communication network. Meanwhile, although a legacy UE 2a-25 attempts to access to the eLTE eNB 2a-20, it cannot communicate with the next generation mobile communication network. Accordingly, it is necessary to prevent the legacy UE 2a-25 from remaining camped on the eLTE eNB 2a-20 connected only to the NG core 2a-10.

The present disclosure proposes a method for preventing a legacy LTE UE from camping on an eLTE eNB connected only to an NG core using a combination of a legacy IE and a new IE in the system information broadcast by the LTE eNB.

Table 1 shows the ASN.1 for system information block (SIB) 1 (SIB1) specified for the legacy LTE technology. In the present disclosure, new IEs are included in the SIB1.

TABLE 1

SystemInformationBlockType1 message

```
-- ASN1START
SystemInformationBlockType1-BR-r13 ::=   SystemInformationBlockType1
SystemInformationBlockType1 ::=          SEQUENCE {
    cellAccessRelatedInfo                    SEQUENCE {
        plmn-IdentityList                        PLMN-IdentityList,
        trackingAreaCode                         TrackingAreaCode,
        cellIdentity                             CellIdentity,
        cellBarred                               ENUMERATED {barred, notBarred},
        intraFreqReselection                     ENUMERATED {allowed, notAllowed},
        csg-Indication                           BOOLEAN,
        csg-Identity                             CSG-Identity                    OPTIONAL      -- Need OR
    },
    cellSelectionInfo                        SEQUENCE {
        q-RxLevMin                               Q-RxLevMin,
        q-RxLevMinOffset                         INTEGER (1 ... 8)               OPTIONAL      -- Need OP
    },
    p-Max                                    P-Max                               OPTIONAL,     --Need OP
    freqBandIndicator                        FreqBandIndicator,
    schedulingInfoList                       SchedulingInfoList,
    tdd-Config                               TDD-Config                          OPTIONAL,     -- Cond TDD
    si-WindowLength                          ENUMERATED {
                                                 ms1, ms2 , ms5, ms10, ms15, ms20,
                                                 ms40},
    systemInfoValueTag                       INTEGER (0 ... 31),
    nonCriticalExtension                     SystemInformationBlockType1-v890-IEs              OPTIONAL
}
SystemInformationBlockType1-v890-IEs: :=  SEQUENCE {
    lateNonCriticalExtension                 OCTET STRING (CONTAINING SystemInformationBlockType1-
v8h0-IEs)                                    OPTIONAL,
    nonCriticalExtension                     SystemInformationBlockType1-v920-IEs              OPTIONAL
}
-- Late non critical extensions
SystemInformationBlockType1-v8h0-IEs : :=         SEQUENCE {
    multiBandInfoList                        MultiBandInfoList                   OPTIONAL,     -- Need OR
    nonCriticalExtension                     SystemInformationBlockType1-v9e0-IEs              OPTIONAL
}
SystemInformationBlockType1-v9e0-IEs : :=         SEQUENCE {
    freqBandIndicator-v9e0                   FreqBandIndicator-v9e0              OPTIONAL,     -- Cond FBI-max
    multiBandInfoList-v9e0                   MultiBandInfoList-v9e0              OPTIONAL,     -- Cond mFBI-max
    nonCriticalExtension                     SystemInformationBlockType1-v10j0-IEs             OPTIONAL
}
SystemInformationBlockType1-v10j0-IEs : :=        SEQUENCE {
    freqBandInfo-r10                         NS-PmaxList-r10                     OPTIONAL,     -- Need OR
    multiBandInfoList-v10j0                  MultiBandInfoList-v10j0             OPTIONAL,     -- Need OR
    nonCriticalExtension                     SEQUENCE { }                        OPTIONAL
}
-- Regular non critical extensions
SystemInformationBlockType1-v920-IEs : :=         SEQUENCE {
    ims-EmergencySupport-r9                  ENUMERATED {true}                   OPTIONAL,     -- Need OR
    cellSelectionInfo-v920                   CellSelectionInfo-v920              OPTIONAL,     -- Cond RSRQ
    nonCriticalExtension                     SystemInformationBlockType1-v1130-IEs             OPTIONAL
}
```

TABLE 1-continued

SystemInformationBlockType1 message

```
SystemInformationBlockType1-v1130-IEs : :=        SEQUENCE {
   tdd-Config-v1130                               TDD-Config-v1130                      OPTIONAL,     -- Cond TDD-OR
   cellSelectionInfo-v1130                        CellSelectionInfo-v1130               OPTIONAL,     -- Cond WB-RSRQ
   nonCriticalExtension                           SystemInformationBlockType1-v1250-IEs               OPTIONAL
}
SystemInformationBlockType1-v1250-IEs : : =       SEQUENCE {
   cellAccessRelatedInfo-v1250                       SEQUENCE {
      category0Allowed-r12                                 ENUMERATED {true}            OPTIONAL        --
Need OP
   },
   cellSelectionInfo-v1250                        CellSelectionInfo-v1250               OPTIONAL,     -- Cond
RSRQ2
   freqBandIndicatorPriority-r12                  ENUMERATED {true}                     OPTIONAL,     -- Cond
mFBI
   nonCriticalExtension                           SystemInformationBlockType1-v1310-IEs               OPTIONAL
}
SystemInformationBlockType1-v1310-IEs : : =       SEQUENCE {
   hyperSFN-r13                                   BIT STRING {SIZE (10)}                OPTIONAL,     --
Need OR
   eDRX-Allowed-r13                               ENUMERATED {true}                     OPTIONAL,     --
Need OR
   cellSelectionInfoCE-r13                        CellSelectionInfoCE-r13 OPTIONAL,                   -- Need OP
   bandwidthReducedAccessRelatedInfo-r13          SEQUENCE {
      si-WindowLength-BR-r13                         ENUMERATED {
                                                      ms20, ms40, ms60, ms80, ms120,
                                                      ms160, ms200, spare},
      si-RepetitionPattern-r13                       ENUMERATED {everyRF, every2ndRF, every4thRF,
                                                                 every8thRF},
      schedulingInfoList-BR-r13                      SchedulingInfoList-BR-r13          OPTIONAL,     --
Need OR
      fdd-DownlinkOrTddSubframeBitmapBR-r13          CHOICE {
         subframePattern10-r13                          BIT STRING (SIZE (10)),
         subframePattern40-r13                          BIT STRING (SIZE (40))
      }                                                                                OPTIONAL,     --
Need OP
      fdd-UplinkSubframeBitmapBR-r13                 BIT STRING (SIZE (10))             OPTIONAL,     --
Need OP
      startSymbolBR-r13                              INTEGER (1 . . . 4),
      si-HoppingConfigCommon-r13                     ENUMERATED {on,off},
      si-ValidityTime-r13                            ENUMERATED {true}                  OPTIONAL,     --
Need OP
      systemInfoValueTagList-r13                     SystemInfoValueTagList-r13         OPTIONAL       --
Need OR
   }                                                                                   OPTIONAL,     --
Cond BW-reduced
   nonCriticalExtension                           SystemInformationBlockType1-v1320-IEs
   OPTIONAL
}
SystemInformationBlockType1-v1320-IEs : :=        SEQUENCE {
   freqHoppingParametersDL-r13                    SEQUENCE {
      mpdcch-pdsch-HoppingNB-r13                     ENUMERATED {nb2, nb4}              OPTIONAL,     --
Need OR
      interval-DLHoppingConfigCommonModeA-r13 CHOICE {
         interval-FDD-r13                              ENUMERATED {int1, int2, int4, int8},
         interval-TDD-r13                              ENUMERATED {int1, int5, int10, int20}
      }                                                                                OPTIONAL,     --
Need OR
      interval-DLHoppingConfigCommonModeB-r13 CHOICE {
         interval-FDD-r13                              ENUMERATED {int2, int4, int8, int16},
         interval-TDD-r13                              ENUMERATED { int5, int10, int20, int40}
      }                                                                                OPTIONAL,     --
Need OR
      mpdcch-pdsch-HoppingOffset-r13                 INTEGER (1 . . . maxAvailNarrowBands-r13)
      OPTIONAL        -- Need OR
   }                                                                                   OPTIONAL,     --
Cond Hopping
   nonCriticalExtension                           SystemInformationBlockType1-v1350-IEs
            OPTIONAL
}
SystemInformationBlockType1-v1350-IEs : :=        SEQUENCE {
   cellSelectionInfoCE1-r13                       CellSelectionInfoCE1-r13              OPTIONAL,     --
Need OP
   nonCriticalExtension                           SystemInformationBlockType1-v14xy-IEs
      OPTIONAL
}
```

TABLE 1-continued

SystemInformationBlockType1 message

```
SystemInformationBlockType1-v14xy-IEs ::=         SEQUENCE {
    eCallOverIMS-Support-r14                      ENUMERATED {true}                OPTIONAL,     --
Need OR
    tdd-Config-v14xy                              TDD-Config-v14xy                 OPTIONAL,     --
Cond TDD-OR
    nonCriticalExtension                          SEQUENCE { }                     OPTIONAL
}
SystemInformationBlockType1-v15xx-IEs ::=         SEQUENCE {
    cellBarred-r15                                ENUMERATED {barred, notBarred},
    plmn-IdentityList                             PLMN-IdentityList5GCN,
    nonCriticalExtension                          SEQUENCE { } OPTIONAL
PLMN-IdentityList :: =                            SEQUENCE (SIZE (1 . . . maxPLMN-r11)) OF PLMN-IdentityInfo
PLMN-IdentityInfo :: =                            SEQUENCE {
    plmn- Identity                                PLMN-Identity,
    cellReservedForOperatorUse                    ENUMERATED {reserved, notReserved}
}
PLMN-IdentityList5GCN         ::=SEQUENCE(SIZE(1 . . . maxPLMN-r11)) OF PLMN-IdentifyInfo5GCN
PLMN-IdentityInfo5GCN         ::=SEQUENCE {
    plmn-Identity                                 PLMN-Identity,
    cellReservedForOperatorUse                    ENUMERATE {reserved,notReserved},
    cnType                                        ENUMERATED {EPC,5GCN}
SchedulingInfoList     := SEQUENCE (SIZE (1 . . . maxSI-Message)) OF SchedulingInfo
SchedulingInfo := SEQUENCE {
    si-Periodicity                                ENUMERATED {
                                                      rf8, rf16, rf32, rf64, rf128, rf256, rf512},
    sib-MappingInfo                               SIB-MappingInfo
}
SchedulingInfoList-BR-r13       := SEQUENCE (SIZE (1 . . . maxSI-Message)) OF SchedulingInfo-BR-r13
SchedulingInfo-BR-r13 :=        SEQUENCE {
    si-Narrowband-r13                             INTEGER (1 . . . maxAvailNarrowBands-r13),
    si-TBS-r13                                    ENUMERATED {b152, b208, b256, b328, b408, b504, b600,
                                                      b712, b808, b936}
}
SIB-MappingInfo := SEQUENCE (SIZE (0 . . . maxSIB-1)) OF SIB-Type
SIB-Type ::=                                      ENUMERATED {
                                                      sibType3, sibType4, sibType5, sibType6,
                                                      sibType7, sibType8, sibType9, sibType10,
                                                      sibType11, sibType12-v920, sibType13-v920,
                                                      sibType14-v1130, sibType15-v1130,
                                                      sibType16-v1130, sibType17-v1250, sibType18-v1250,
                                                      . . . , sibType19-v1250, sibType20-v1310, sibType21-
v14x0}
SystemInfoValueTagList-r13 :: =                   SEQUENCE (SIZE (1 . . . maxSI-Message)) OF
SystemInfoValueTagSI-r13
SystemInfoValueTagSI-r13 ::=                      INTEGER (0 . . . 3)
CellSelectionInfo-v920 ::=                        SEQUENCE {
    q-QualMin-r9                                  Q-QualMin-r9,
    q-QualMinOffset-r9                            INTEGER (1 . . . 8)              OPTIONAL      --
Need OP
}
CellSelectionInfo-v1130 ::=                       SEQUENCE {
    q-QualMinWB-r11                               Q-QualMin-r9
}
CellSelectionInfo-v1250 ::=                       SEQUENCE {
    q-QualMinRSRQ-OnAllSymbols-r12                                                 Q-QualMin-r9
}
-- ASN1STOP
```

If the eNB that broadcasts the SIB 1 is an eLTE eNB connected only to the NG core, the legacy cellBarred IE is set to 'barred' in the SIB1. This prohibits the legacy UEs from camping on the corresponding cell. The legacy UEs can understand only the legacy IEs including the cellBarred IE for use in prohibiting camping-on to the corresponding network. If the legacy cellBarred IE is set to 'barred,' even the emergency call service access is denied by the corresponding cell.

The eLTE eNB connected only to the NG core broadcasts newly specified cellBarred-r15 IE and plmn-IdentityList5GCN IE to support the eLTE UEs. The cellBarred-r15 IE is configured for the purpose of prohibiting the eLTE UEs supported by the eLTE eNB connected only to the NG core from access or camp-on to the eLTE eNB, and the plmn-IdentityList5GCN is configured for the purpose of providing NG core-related public land mobile network (PLMN) information.

An eLTE eNB connected to both the MME and NG core may support both the legacy and eLTE UEs. The legacy cellBarred IE is set to 'notBarred' for any unusual purpose. The new cellBarred IE is also set to 'notBarred.' Meanwhile, the eLTE eNB connected only to the NG core cannot support the legacy UE but the eLTE UE. Accordingly, the legacy cellBarred IE is set to 'barred.' Also, the new cellBarred IE is set to 'notBarred.'

The eLTE UE ascertains the type of the network supported by the corresponding cell in consideration of the legacy plmn-IdentityList and the newly-defined plmn-IdentityList5GCN. The PLMN IDs included in the legacy plmn-IdentityList and newly-defined plmn-IdentityList5GCN IEs may be identical with or different from each other. This is determined by the operator.

The new PLMN configuration information may further include the information on the network entity, i.e., LTE MME or NG core entity, to which the corresponding PLMN is connected. This aims to make it possible for the eLTE UE to select one of the MME or NG core.

The eLTE UE transmits to the MME a non-access stratum (NAS) message generated in the legacy format and to the NG core the NAS message generated in a new format in order for the MME and the NG core to understand the NAS message.

FIG. 2B is a signal flow diagram illustrating an exemplary procedure of prohibiting access of UEs that are not supported by a next generation mobile communication network according to an embodiment of the present disclosure.

A legacy LTE UE 2b-05 that cannot communicate with an NG core 2b-15 selects a PLMN, i.e., selected PLMN, on an NAS layer at step 2b-20. The selected PLMN is determined in consideration of a home PLMN (HPLMN) or HEPLMN recorded in a universal subscriber identity module (USIM). An eLTE eNB 2b-10 is connected only to the NG core 2b-15. Accordingly, at step 2b-30, the eLTE eNB 2b-10 broadcasts the SIB1 including the cellBarred IE set to 'barred'.

The legacy UEs that receive the SIB1 may not attempt to camp on the corresponding cell. The legacy LTE UE 2b-05 measures neighboring cells and selects the eLTE cell with the best received signal strength at step S2b-25. Next, the legacy LTE UE 2b-05 receives the system information broadcast via the corresponding cell at step 2b-30. Since the cellBarred IE included in the SIB1 is set to 'barred', the legacy LTE UE 2b-05 assumes that its access to the corresponding cell is barred and does not attempt to camp on the corresponding cell at step 2b-35. The access barring for a UE is released after a predetermined time. The legacy LTE UE 2b-05 searches for another cell at step 2b-40.

FIG. 2C is a signal flow diagram illustrating an exemplary procedure of prohibiting access of a UE being supported by a next generation mobile communication system according to an embodiment of the present disclosure.

An eLTE UE 2c-05 that is capable of communicating with an NG core 2c-15 selects a PLMN, i.e., selected PLMN, on a NAS layer at step 2c-20. The selected PLMN is determined in consideration of a home PLMN (HPLMN) or HEPLMN recorded in a USIM. An eLTE eNB 2c-10 is connected only to the NG core 2c-15. Accordingly, at step 2c-30, the eLTE eNB 2c-10 broadcasts the SIB1 including the cellBarred IE set to 'barred.' The legacy UEs that receives the SIB1 may not attempt to camp on the corresponding cell.

The eLTE eNB 2c-10 may also set the new cellBarred-r15 IE to 'notBarred' in order for the eLTE UEs still to camp on the corresponding cell. In order to bar access of the eLTE UEs to the corresponding cell, the IE cellBarred-r15 IE is set to 'barred.' The eLTE UE 2c-05 measures neighboring cells and selects an eLTE cell with the best signal strength at step 2c-25. Next, the eLTE UE 2c-20 receives the system information broadcast via the corresponding cell at step 2c-30. Since the cellBarred IE is set to 'barred' and the cellBarred-r15 IE is set to 'notBarred' in the SIB1, the eLTE UE 2c-05 camps on the corresponding cell at step 2c-35.

If at least one of the cellBarred IE and the cellBarred-r15 IE is set to 'notBarred', the eLTE assumes that its access to the corresponding cell is not barred. If the new IE is not configured, the procedure should be performed based on only the configuration information of the legacy IE. The access barring for a UE is released after a predetermined time. The eLTE UE 2c-05 performs a setup for communication with the NG core 2c-40.

At step 2c-45, the eLTE UE 2c-05 transmits to the NG core 2c-15 an Attach Request message including the information on the selected PLMN. The selected PLMN should be included in the newly introduced plmn-IdentityList5GCN for access to usual services. Otherwise, only limited services such an emergency call service, are allowed for the UE to access via the corresponding cell. At step 2c-50, the NG core 2c-15 transmits to the UE 2c-05 an Attach Accept message including an ePLMN list. Here, the selected PLMN is regarded as a registered PLMN.

Figure 2D:
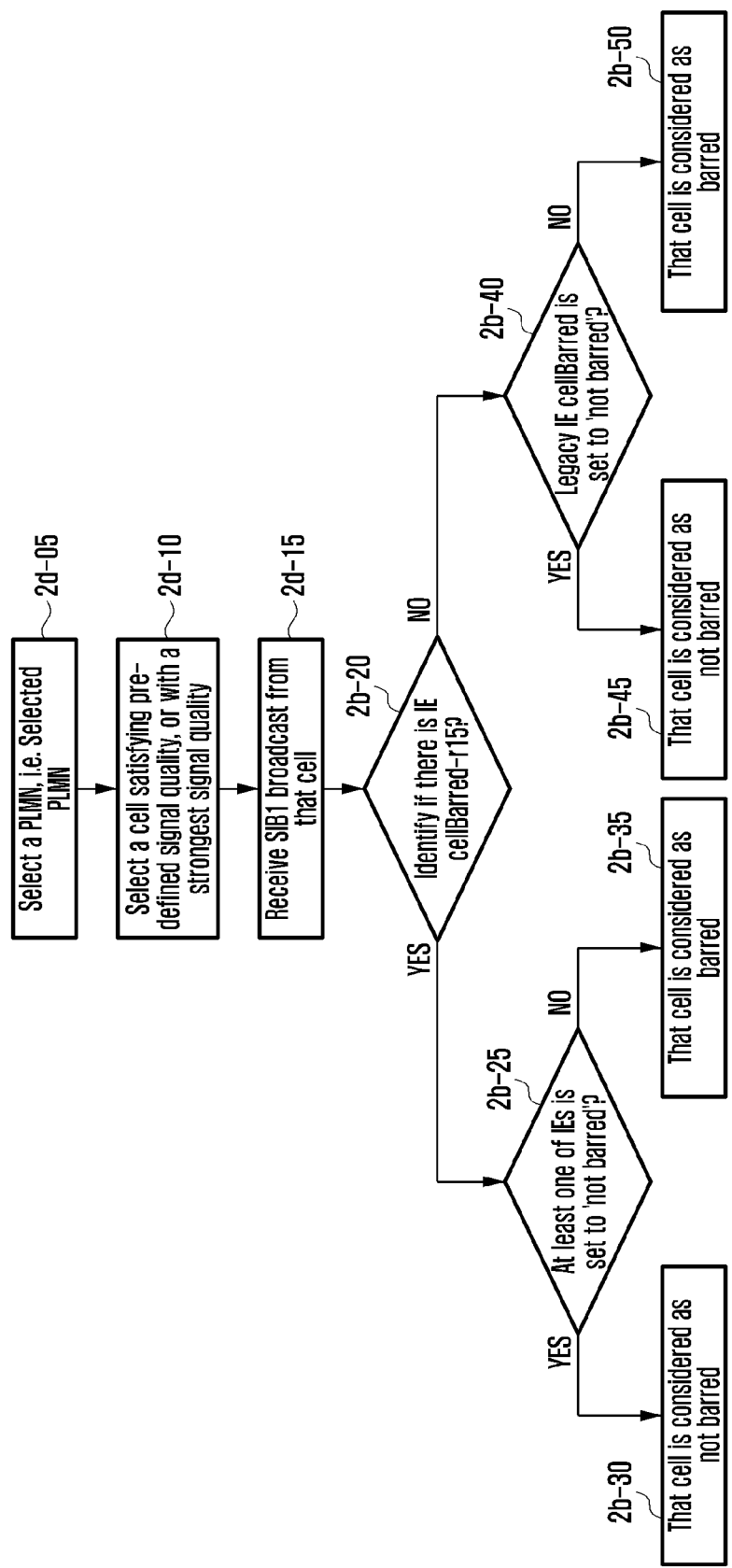
FIG. 2D is an exemplary flowchart illustrating an operation of a UE in a next generation mobile communication system according to an embodiment of the present disclosure.

FIG. 2D is an exemplary flowchart illustrating an exemplary operation of a UE in a next generation mobile communication system according to an embodiment of the present disclosure.

At step 2d-05, a UE NAS layer selects a PLMN, i.e., selected PLMN. The selected PLMN is determined in consideration of the HPLMN or HEPLMN registered in a USIM. At step 2d-10, the UE selects a cell with a signal quality better than a predetermined level or a highest signal quality among the cells supporting the selected PLMN.

At step 2d-15, the UE receives the SIB1 via the selected cell. At step 2d-20, the UE determines whether the received SIB1 includes a cellBarred-r15 IE. If it is determined that the received SIB1 includes the cellBarred-r15 IE, the UE determines whether at least one of the cellBarred IE and the cellBarred-r15 included in the SIB1 is set to 'notBarred'. If at least one of the cellBarred IE and the cellBarred-r15 is set to 'notBarred', the UE assumes at step 2d-30 that its access to the corresponding cell is not barred. If neither the cellBarred IE nor the cellBarred-r15 is set to 'notBarred', the UE assumes at step 2d-35 that its access to the corresponding cell is barred.

If it is determined that the received SIB1 includes no cellBarred-r15 IE, the UE determines at step 2d-40 whether the cellBarred IE is set to 'notBarred'. If it is determined that the cellBarred IE is set to 'notBarred', the UE assumes at step 2d-45 that its access to the corresponding cell is not barred. If it is determined that the cellBarred IE is not set to 'notBarred', the UE assumes at step 2d-50 that its access to the corresponding cell is barred.

Figure 2E:
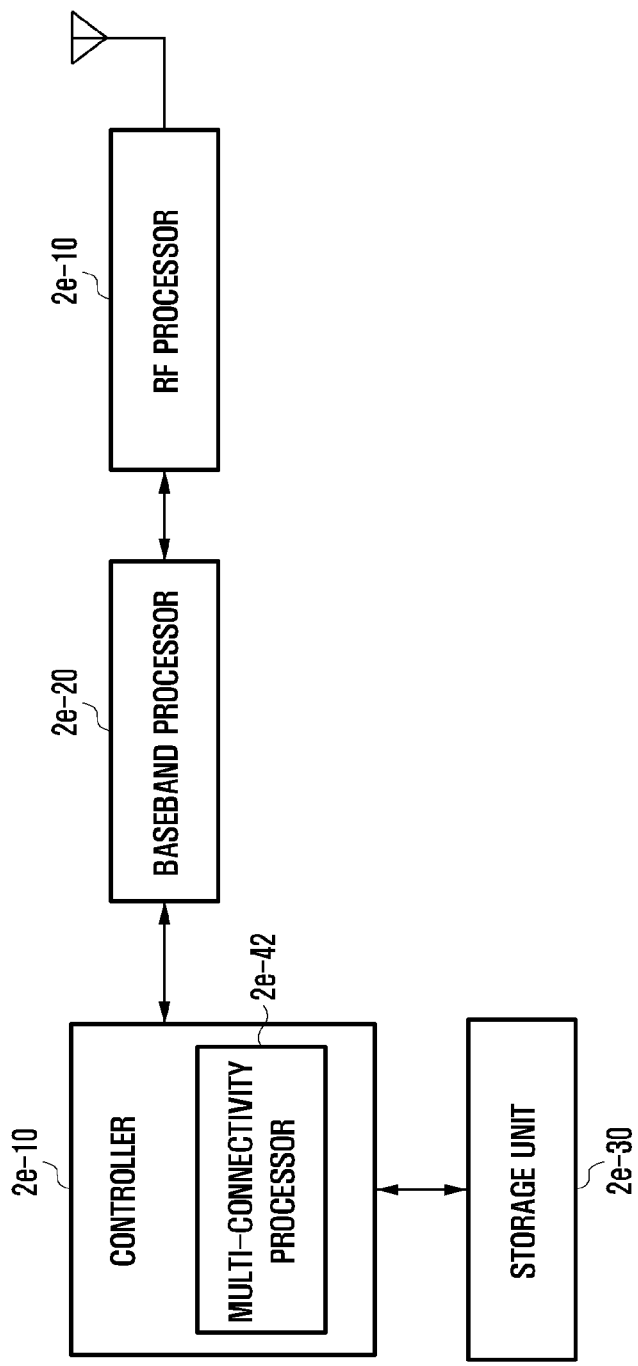
FIG. 2E is an exemplary block diagram illustrating a configuration of a UE according to an embodiment of the present disclosure.

FIG. 2E is an exemplary block diagram illustrating an exemplary configuration of a UE according to an embodiment of the present disclosure.

The legacy UE and the eLTE UE according to an embodiment of the present disclosure may be configured as shown in FIG. 2E.

In reference to FIG. 2E, the UE includes a radio frequency (RF) processor 2e-10, a baseband processor 2e-20, a storage unit 2e-30, and a controller 2e-40.

The RF processor 2e-10 has a function for transmitting/receiving a signal over a radio channel such as band conversion and amplification of the signal. That is, the RF processor 2e-10 up-converts a baseband signal from the baseband processor 2e-20 to an RF band signal and transmits the RF signal via an antenna and down-converts the RF signal received via the antenna to a baseband signal. For example, the RF processor 2e-10 may include a transmission filter, a reception filter, an amplifier, a mixer, an oscillator, a digital-to-analog converter (DAC), and an analog-to-digital converter (ADC).

Although one antenna is depicted in the drawing, the UE may be provided with a plurality of antennas. The RF processor 2e-10 may also include a plurality of RF chains. The RF processor 2e-10 may perform beamforming. For beamforming, the RF processor 2e-10 may adjust the phase and size of a signal to be transmitted/received by means of the antennas or antenna elements in phase and size. The RF processor 2e-1—may be configured to support a MIMO scheme with which the UE can receive multiple layers simultaneously The baseband processor 2e-20 has a baseband signal-bit string conversion function according to a physical layer standard of the system. For example, in a data transmission mode, the baseband processor 2e-20 performs encoding and modulation on the transmission bit string to generate complex symbols. In a data reception mode, the baseband processor 2e-20 performs demodulation and decoding on the baseband signal from the RF processor 2e-10 to recover the transmitted bit string. In the case of using an OFDM scheme for data transmission, the baseband processor 2e-20 performs encoding and modulation on the transmission bit string to generate complex symbols, maps the complex symbols to subcarriers, performs inverse fast Fourier transform (IFFT) on the symbols, and inserts a cyclic prefix (CP) into the symbols to generate OFDM symbols.

In the data reception mode, the baseband processor 2e-20 splits the baseband signal from the RF processor 2e-10 into OFDM symbols, performs fast Fourier transform (FFT) on the OFDM symbols to recover the signals mapped to the subcarriers, and performs demodulation and decoding on the signals to recover the transmitted bit string.

The baseband processor 2e-20 and the RF processor 2e-10 process the transmission and reception signals as described above. Accordingly, the baseband processor 2e-20 and the RF processor 2e-10 may be referred to as a transmitter, a receiver, a transceiver, or a communication unit. At least one of the baseband processor 2e-20 and the RF processor 2e-10 may include a plurality of communication modules for supporting different radio access technologies.

At least one of the baseband processor 2e-20 and the RF processor 2e-10 may also include multiple communication modules for processing the signals in different frequency bands. For example, the different radio access technologies may include a wireless local area network (WLAN) (e.g., Institute of Electrical and Electronics Engineers (IEEE) 802.11) and a cellular network (e.g., LTE). The different frequency bands may include a super high frequency (SHF) band (e.g., 2.NRHz and NRhz bands) and an mmWave band (e.g., 60 GHz).

The storage unit 2e-30 stores data such as basic programs for operation of the UE, application programs, and setting information. The storage unit 2e-30 may also store the information on a second access node for radio communication with a second radio access technology. The storage unit 2e-30 provides the stored information in response to a request from the controller 2e-40.

The controller 2e-40 controls overall operations of the UE. For example, the controller 2e-40 controls the baseband processor 2e-20 and the RF processor 2e-10 for transmitting and receiving signals. The controller 2e-40 writes and reads data to and from the storage unit 2e-40. For this purpose, the controller 2e-40 may include at least one processor. For example, the controller 2e-40 may include a communication processor (CP) for controlling communications and an application processor (AP) for controlling higher layer programs such as applications.

Figure 2F:
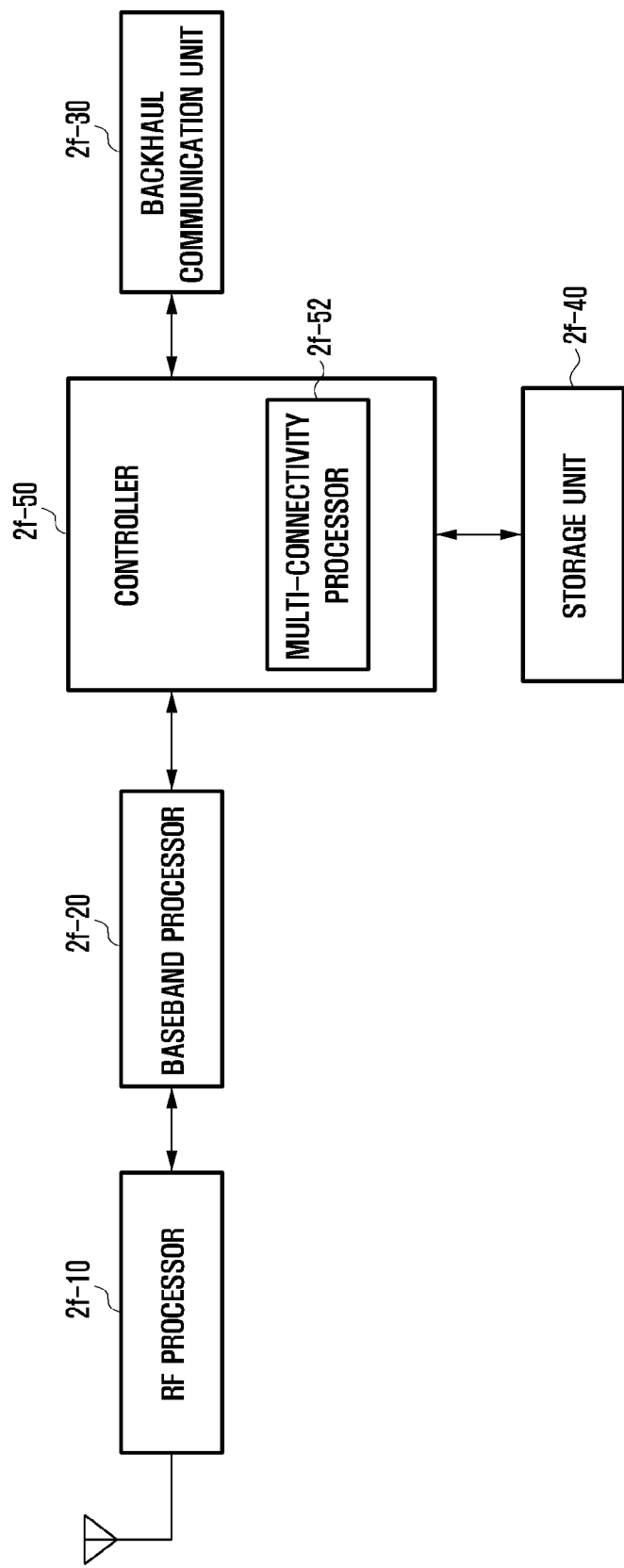
FIG. 2F is an exemplary block diagram illustrating a configuration of a gNB according to an embodiment of the present disclosure.

FIG. 2F is an exemplary block diagram illustrating an exemplary configuration of a gNB according to an embodiment of the present disclosure.

According to an embodiment of the present disclosure, the gNB connected to at least one of an MME and an NG core may be configured as shown in FIG. 2F. As shown in the drawing, the gNB includes an RF processor 2f-10, a baseband processor 2f-20, a backhaul communication unit 2f-30, a storage unit 2f-40, and a controller 2f-50.

The RF processor 2f-10 has a function for transmitting/receiving a signal over a radio channel such as band conversion and amplification of the signal. That is, the RF processor 2f-10 up-converts a baseband signal from the baseband processor 2f-20 to an RF band signal and transmits the RF signal via an antenna and down-converts the RF signal received via the antenna to a baseband signal. For example, the RF processor 2f-10 may include a transmission filter, a reception filter, an amplifier, a mixer, an oscillator, a DAC, and an ADC.

Although one antenna is depicted in the drawing, the gNB may be provided with a plurality of antennas. The RF processor 2f-10 may also include a plurality of RF chains. The RF processor 1i-10 may perform beamforming. For beamforming, the RF processor 2f-10 may adjust the phase and size of a signal to be transmitted/received by means of the antennas or antenna elements. The RF processor 2f-10 may be configured to transmit one or more layers for a downlink MIMO operation.

The baseband processor 2f-20 has a baseband signal-bit string conversion function according to a physical layer standard of the system. For example, in a data transmission mode, the baseband processor 2f-20 performs encoding and modulation on the transmission bit string to generate complex symbols. In a data reception mode, the baseband processor 2f-20 performs demodulation and decoding on the baseband signal from the RF processor 2f-10 to recover the transmitted bit string. In the case of using an OFDM scheme for data transmission, the baseband processor 2f-20 performs encoding and modulation on the transmission bit string to generate complex symbols, maps the complex symbols to subcarriers, performs inverse fast Fourier transform (IFFT) on the symbols, and inserts a cyclic prefix (CP) into the symbols to generate OFDM symbols.

In the data reception mode, the baseband processor 2f-20 splits the baseband signal from the RF processor 2f-10 into OFDM symbols, performs fast Fourier transform (FFT) on the OFDM symbols to recover the signals mapped to the subcarriers, and performs demodulation and decoding on the signals to recover the transmitted bit string. The baseband processor 2f-20 and the RF processor 2f-10 process the transmission and reception signals as described above. Accordingly, the baseband processor 2f-20 and the RF processor 2f-10 may be referred to as a transmitter, a receiver, a transceiver, or a communication unit.

The backhaul communication unit 2f-30 provides an interface for communication with other nodes in the network. That is, the backhaul communication unit 2f-30 converts a bit string to be transmitted from the gNB to another node, e.g., another gNB and core network, to a physical signal and converts a physical signal received from another node to a bit string.

The storage unit 2f-40 stores data such as basic programs for operation of the gNB, application programs, and setting information. The storage unit 2f-40 may also store the information on the bearers established for UEs and measurement results reported by the connected UEs. The storage unit 2f-40 may also store the information for use by a UE in determining whether to enable or disable multi-connectivity. The storage unit 2f-40 may provide the stored data in reference to a request from the controller 2f-50.

The controller 2f-50 controls overall operations of the gNB. For example, the controller 2f-50 controls the baseband processor 2f-20, the RF processor 2f-10, and the backhaul communication unit 2f-30 for transmitting and receiving signals. The controller 2f-50 writes and reads data to and from the storage unit 2f-40. For this purpose, the controller 2f-50 may include at least one processor.

As described above, the present disclosure is advantageous in terms of overcoming a performance limitation caused by UL-DL coverage mismatch in such a way as to enable a terminal to use a UL frequency for broader coverage.

Also, the present disclosure is advantageous in terms of preventing a legacy terminal from accessing a next generation mobile communication network by configuring system information in such a way as to include a legacy IE and a new IE, the system information being broadcast by a base station.

The methods specified in the claims and specification can be implemented by hardware, software, or a combination of them.

In the case of being implemented in software, it may be possible to store at least one program (software module) in a computer-readable storage medium. The at least one program stored in the computer-readable storage medium may be configured for execution by at least one processor embedded in an electronic device. The at least one program includes instructions executable by the electronic device to perform the methods disclosed in the claims and specifications of the present disclosure.

Such a program (software module or software program) may be stored in a non-volatile memory such as random access memory (RAM) and flash memory, Read Only Memory (ROM), Electrically Erasable Programmable Read Only Memory (EEPROM), a magnetic disc storage device, a Compact Disc-ROM (CD-ROM), Digital Versatile Discs (DVDs) or other type of optical storage device, and a magnetic cassette. It may also be possible to store the program in a memory device implemented in combination of part or whole of the aforementioned media. The storage unit may include a plurality of memories.

The program may be stored in an attachable storage device accessible through a communication network implemented as a combination of Internet, intranet, Local Area Network (LAN), Wireless LAN (WLAN), and Storage Area Network (SAN). The storage device may be attached to the device performing the methods according to embodiments of the present disclosure by means of an external port. It may also be possible for a separate storage device installed on a communication network to attach to the device performing the methods according to embodiments of the present disclosure.

In the embodiments of the present disclosures, the components are described in singular or plural forms depending on the embodiment. However, the singular and plural forms are selected appropriately for the proposed situation just for explanatory convenience without any intention of limiting the present disclosure thereto; thus, the singular form includes the plural form as well, unless the context clearly indicates otherwise.

Although the description has been made with reference to particular embodiments, the present disclosure can be implemented with various modifications without departing from the scope of the present disclosure. Thus, the present disclosure is not limited to the particular embodiments disclosed, and it will include the following claims and their equivalents.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a terminal in a wireless communication system, the method comprising:
   performing a random access procedure with a base station on a supplementary uplink (SUL) frequency band;
   performing both a physical uplink shared channel (PUSCH) transmission and a physical uplink control channel (PUCCH) transmission on the SUL frequency band;
   identifying whether information on a PUSCH configuration for an uplink (UL) frequency band is configured for the terminal; and
   in case that the information on the PUSCH configuration for the UL frequency band is configured for the terminal, switching the PUSCH transmission to the UL frequency band while the PUCCH transmission is continued on the SUL frequency band.

2. The method of claim 1,
   wherein the information on the PUSCH configuration for the UL frequency band is received via a radio resource control (RRC) message, and
   wherein the RRC message further includes at least one of information indicating random access to the UL frequency band, or frequency information on the UL frequency band.

3. The method of claim 1, wherein the information on the PUSCH configuration for the UL frequency band is configured for the terminal based on at least one of a report for a maximum transmission power of the terminal associated with the UL frequency band, a request by the terminal, measurement information on the UL frequency band or a buffer status report (BSR) of the terminal.

4. The method of claim 1, further comprising:
   receiving, from the base station, system information including random access channel (RACH) configuration information,
   wherein the random access procedure is performed based on the RACH configuration information.

5. A method performed by a base station in a wireless communication system, the method comprising:
   performing a random access procedure with a terminal on a supplementary uplink (SUL) frequency band,
   performing both a physical uplink shared channel (PUSCH) reception and a physical uplink control channel (PUCCH) reception on the SUL frequency band;
   determining whether to configure information on a PUSCH configuration for an uplink (UL) frequency band for the terminal; and
   in case that the information on the PUSCH configuration for the UL frequency band is configured for the terminal, switching the PUSCH reception to the UL frequency band while the PUCCH reception is continued on the SUL frequency band.

6. The method of claim 5,
   wherein the information on the PUSCH configuration for the UL frequency band is transmitted via a radio resource control (RRC) message, and
   wherein the RRC message further includes at least one of information indicating random access to the UL frequency band or frequency information on the UL frequency band.

7. The method of claim 5,
   wherein whether to configure the information on the PUSCH configuration for the UL frequency band for the terminal is determined based on at least one of a report for a maximum transmission power of the terminal associated with the UL frequency band, a request by the terminal, measurement information on the UL frequency band or a buffer status report (BSR) of the terminal.

8. The method of claim 5, further comprising:
transmitting, to the terminal, system information including random access channel (RACH) configuration information,
wherein the random access procedure is performed based on the RACH configuration information.

9. A terminal in a wireless communication system, the terminal comprising:
a transceiver; and
a controller configured to:
perform a random access procedure with a base station on a supplementary uplink (SUL) frequency band,
perform both a physical uplink shared channel (PUSCH) transmission and a physical uplink control channel (PUCCH) transmission on the SUL frequency band,
identify whether information on a PUSCH configuration for an uplink (UL) frequency band is configured for the terminal, and
in case that the information on the PUSCH configuration for the UL frequency band is configured for the terminal, switch the PUSCH transmission to the UL frequency band while the PUCCH transmission is continued on the SUL frequency band.

10. The terminal of claim 9,
wherein the information on the PUSCH configuration for the UL frequency band is received via a radio resource control (RRC) message, and
wherein the RRC message further includes at least one of information indicating random access to the UL frequency band, or frequency information on the UL frequency band.

11. The terminal of claim 9, wherein the information on the PUSCH configuration for the UL frequency band is configured for the terminal based on at least one of a report for a maximum transmission power of the terminal associated with the UL frequency band, a request by the terminal, measurement information on the UL frequency band or a buffer status report (BSR) of the terminal.

12. The terminal of claim 9,
wherein the controller is further configured to receive, via the transceiver from the base station, system information including random access channel (RACH) configuration information, and
wherein the random access procedure is performed based on the RACH configuration information.

13. A base station in a wireless communication system, the base station comprising:
a transceiver; and
a controller configured to:
perform a random access procedure with a terminal on a supplementary uplink (SUL) frequency band,
perform both a physical uplink shared channel (PUSCH) reception and a physical uplink control channel (PUCCH) reception on the SUL frequency band,
determine whether to configure information on a PUSCH configuration for an uplink (UL) frequency band for the terminal, and
in case that the information on the PUSCH configuration for the UL frequency band is configured for the terminal, switch the PUSCH reception to the UL frequency band while the PUCCH reception is continued on the SUL frequency band.

14. The base station of claim 13,
wherein the information on the PUSCH configuration for the UL frequency band is transmitted via a radio resource control (RRC) message, and
wherein the RRC message further includes at least one of information indicating random access to the UL frequency band or frequency information on the UL frequency band.

15. The base station of claim 13,
wherein whether to configure the information on the PUSCH configuration for the UL frequency band for the terminal is determined based on at least one of a report for a maximum transmission power of the terminal associated with the UL frequency band, a request by the terminal, measurement information on the UL frequency band or a buffer status report (BSR) of the terminal.

16. The base station of claim 13,
wherein the controller is further configured to transmit, via the transceiver to the terminal, system information including random access channel (RACH) configuration information, and
wherein the random access procedure is performed based on the RACH configuration information.

* * * * *